US012645920B2

(12) United States Patent  
Gunnai et al.

(10) Patent No.: US 12,645,920 B2  
(45) Date of Patent: Jun. 2, 2026

(54) EXPLAINABLE NEURAL NETWORK FOR ANOMALY DETECTION

(71) Applicant: Ping Identity International, Inc., Denver, CO (US)

(72) Inventors: Raghavendra Gunnai, Marlboro, NJ (US); Raminder Deep Singh Kaler, Redwood City, CA (US); Sudhakar Peddibhotla, Seattle, WA (US)

(73) Assignee: Ping Identity International, Inc., Denver, CO (US)

( * ) Notice: Subject to any disclaimer, the term of this patent is extended or adjusted under 35 U.S.C. 154(b) by 519 days.

(21) Appl. No.: 18/144,741

(22) Filed: May 8, 2023

(65) Prior Publication Data

US 2024/0378423 A1 Nov. 14, 2024

(51) Int. Cl.  
*G06N 3/0455* (2023.01)

(52) U.S. Cl.  
CPC .................................. *G06N 3/0455* (2023.01)

(58) Field of Classification Search  
None  
See application file for complete search history.

(56) References Cited

U.S. PATENT DOCUMENTS

| 10,303,576 | B1 | 5/2019 | Seymour et al. | |
| 11,663,067 | B2 * | 5/2023 | Anghel | G06F 11/0709 |
| | | | | 706/21 |
| 12,361,112 | B2 * | 7/2025 | Peddibhotla | G06F 21/40 |

| 2015/0205708 | A1 | 7/2015 | Michelsen | |
| 2016/0140023 | A1 | 5/2016 | Michelsen et al. | |
| 2016/0217062 | A1 | 7/2016 | Singi et al. | |
| 2017/0295062 | A1 | 10/2017 | Tang | |
| 2018/0189033 | A1 | 7/2018 | Narang et al. | |
| 2019/0087075 | A1 | 3/2019 | Dhayanithi et al. | |
| 2020/0125483 | A1 | 4/2020 | Lipke | |
| 2021/0004253 | A1 | 1/2021 | Barnes et al. | |
| 2021/0048994 | A1 * | 2/2021 | Yu | G06N 3/088 |
| 2021/0072966 | A1 | 3/2021 | Zong et al. | |

(Continued)

OTHER PUBLICATIONS

Liu et al. "Anomaly Detection in Manufacturing Systems Using Structured Neural Networks" 2018 IEEE, pp. 175-180.*

(Continued)

*Primary Examiner* — Maikhanh Nguyen

(57) ABSTRACT

Disclosed are a process, system and medium for explaining an anomaly detected in an authentication request by a classifier, including. obtaining the anomaly detection model, with the anomaly detection model having been trained to detect anomalous authentication requests. Also disclosed is obtaining a multi-layer perceptron (MLP) model trained to provide MLP results similar to anomaly detection results when the same features are provided to both the anomaly detection model and the MLP model. During the MLP model training, the anomaly detection model results serve as ground truth; also, detecting, by the anomaly detection model, that the authentication request is anomalous and providing the authentication request features to an explanation tool using the MLP. Based on the detecting, also disclosed is obtaining, from the explanation tool, an explanation comprising at least one identification of the authentication request feature that contributed most to the detection of anomaly.

14 Claims, 13 Drawing Sheets

(56) References Cited

U.S. PATENT DOCUMENTS

| | | | | | |
|---|---|---|---|---|---|
| 2021/0142476 | A1* | 5/2021 | Cao | ............................ | G06T 5/50 |
| 2024/0362316 | A1* | 10/2024 | Peddibhotla | ............ | G06F 21/40 |
| 2024/0364729 | A1* | 10/2024 | Kaler | .................... | H04L 63/083 |

OTHER PUBLICATIONS

Sani et al. "An overview of neural networks use in anomaly Intrusion Detection Systems" 2009 IEEE, 4 pages.*
Srinivasan et al. "Cluster computing for neural network based anomaly detection" 2005 IEEE, pp. 130-134.*
U.S. Appl. No. 18/139,290, filed Apr. 25, 2023, Pending.
U.S. Appl. No. 18/139,296, filed Apr. 25, 2023, Pending.
U.S. Appl. No. 18/139,295, filed Apr. 25, 2023, Pending.
Kingma et al, Auto-Encoding Variational Bayes, arXiv:1312.6114v11 [stat.ML] Dec. 10, 2022, 14 pages.
Bojanowski et al. EnrichingWord Vectors with Subword Information, Association for Computational Linguistics, vol. 5, pp. 135-146, 2017.12 pages (arXiv:1607.04606v2 [cs.CL] ).
Gunning, David, Explainable Artificial Intelligence (XAI), DARPA Information Innovation Office (I2O), Aug. 11, 2016.
AI Explainability 360, IMB Research, 2 pages (downloade Jan. 31, 2023 from http://aix360.mybluemix.net/?_ga=2.82831765.248878821.1675182248-995690514.1675182248).
Arriet et al, Explainable Artificial Intelligence (XAI): Concepts, Taxonomies, Opportunities and Challenges toward Responsible AI, Informatiom Fusiom, Dec. 26, 2019, 73 pages.
Sundararajan, Axiomatic Attribution for Deep Networks, Proceedings of the 34 th International Conference on Machine Learning, Sydney, Australia, PMLR 70, 2017 (arXiv: 1703.01365v2 [cs.LG] Jun. 13, 2017).
Feature Attribution, Stanford CS224U Natural Language Understanding, Spring 2021, YouTube video, published Jan. 6, 2022, (https://www.youtube.com/watch?v=RFE6xdfJvag).
Sigler, Vertex AI Example-based Explanations improve ML via explainability, Aug. 24, 2022, 9 pages (downloaded Apr. 6, 2023 from https://cloud.google.com/blog/products/ai-machine-learning/example-based-explanations-to-build-better-aiml-models).
Akers, A., What Is Step-Up Authentication When To Use It?, Okta, Auth0 Blog, Dec. 17, 2020, 14 pages (downloaded Apr. 6, 2023 from https://auth0.com/blog/what-is-step-up-authentication-when-to-use-it/.
Distinguish step-up from multi-factor authentication, IBM, Mar. 9, 2021, 2 pages, (downloaded Apr. 6, 2023 from https://www.ibm.com/docs/en/sva/9.0.1?topic=authentication-distinguish-step-up-from-multi-factor).
Jordan, J., Variational autoencoders, JeremyJordan. me, Mar. 19, 2019, 15 pages (downloaded Mar. 21, 2023 from https://www.jeremyjordan.me/variational-autoencoders/).
Huang, Z., Extensions to the k-Means Algorithm for Clustering Large Data Sets with Categorical Values, Data Mining and Knowledge Discovery, 2, 283-304 Sep. 1998 Kluwer Academic Publishers, 22 pages (https://doi.org/10.1023/A:1009769707641).
About Autonomous Access—ForgeRock Identity Cloud Docs, ForgeRock, Inc. May 2022, 27 pages (downloaded Dec. 12, 2022 from https://backstage.forgerock.com/docs/idcloud/latest/auto-access/chap-about-autoaccess.html).
"Theme Node, Dynamically theme the ForgeRock out-of-the-box US on the fly", Oct. 2020, ForgeRock, Inc., pp. 5 pgs. (downloaded from https://web.archive.org/web/20201024234908/https://backstage.forgerock.com/marketplace/entry/AXCzY977aAqky-XCyaXV).
"Theme Node, Dynamically theme the ForgeRock out-of-the-box US on the fly", Apr. 2020, ForgeRock, Inc.,, 8 pgs (downloaded from https://github.com/vscheuber/ThemeNode).
McKendrick, What is low-code and no-code? A guide to development platforms, ZDNet, Mar. 3, 2021,9 pgs (downloaded from https://www.zdnet.com/article/special-report-what-is-low-code-no-code-a-guide-to-development-platforms/).
Authentication and Single Sign-On Guide, ForgeRock Access Management 6.5, ForgeRock, Inc., Jul. 4, 2019, 482 pages.
Release Notes, AM 5.0.0, ForgeRock, Inc., Jun. 2, 2020.
Protect Users Witthout Frustrating Them Using AI-Driven Behavorial Biometrics, White Pater, Behavion Sec, 2020, (retrieved Dec. 14, 2021 from https://www.behaviosec.com/wp-content/uploads/2020/11/bhs-whitepaper.pdf).
Behavioral Biometrics for Mobile, BioCatch, 2021, 3 pages (retrieved Dec. 14, 2021 from https://www.biocatch.com/hubfs/New%20Boilerplate/BC%20SB%20Mobile%20Data%20v6%20NBP.pdf).
Innovating the Customer Experience Without Opening Fraud Floodgates, BioCatch, 10 pages (retrieved Dec. 14, 2021 from https://www.biocatch.com/hubfs/WP-Innovate-Customer-Experience-Without-Fraud.pdf).
Threat Matrix Guide, ID Dataweb, 7 pages (retrieved Dec. 14, 2021 from https://docs.iddataweb.com/docs/threatmetrix-1).
Cichonski et al., "Computer Security Incident Handling Guide", National Institute of Standards and Technology, U.S. Department of Commerce, Special Publication 800-61, Revision 2, http://dx.doi.org/10.6028/NIST.SP.800-61r2, Gaithersburg, MD, 2012, 79 pages.
"Hardening your cluster's security", Kubernetes Engine, (https://cloud.google.com/kubernetes-engine/docs/concepts/security-overview), Jul. 2019, 10 pages.
Dempsey, et al., "Information Security Continuous Monitoring (ISCM) for Federal Information Systems and Organizations", NIST National Institute of Standards and Technology, U.S. Dept. of Commerce, NIST Special Publication 800-137, 2011, Gaithersburg, MD, 80 pages.
"Configuring Vertical Pod Autoscaling", Kubernetes Engine, Google Cloud (https://cloud.google.com/kubernetes-engine/), Aug. 14, 2019, 8 pages.
Wilkin, "Kubernetes Deployment Dependencies", https://medium.com/google-cloud/kubernetes-deployment-dependencies-ef703e563956, Jul. 2, 2018, 21 pages.
"Vertical Pod Autoscaling", Kubernetes Engine, https://cloud.google.com/kubernetes-engine/docs/concepts/verticalpodautoscaler), Aug. 29, 2019, 8 pages.
Sakimura et al, "OpenID Connect Dynamic Client Registration 1.0 incorporating errata set 1", https://openid.net/specs/openid-connect-registration-1_0.html, Oct. 1, 2019, 19 pages.
Jayanandana, "Enable Rolling updates in Kubernetes with Zero downtime", https://medium.com/platformer-blog/enable-rolling-updates-in-kubernetes-with-zero-downtime-31d7ec.388c81, Sep. 27, 2018, 6 pages.
"FAQ: IDM/OpenIDM performance and tuning", https://backstage.forgerock.com/knowledge/kb/article/a32504603, Jun. 26, 2019, 7 pages.
Amazon; AWS Elastic Beanstalk Developer Guide; Aug. 2019; 924 pgs (https://web.archive.org/web/20190805110626/https:// docs.aws.amazon.com/elasticbeanstalk/latest/dg/awseb-dg.pdf).

* cited by examiner

300b

```
from tensorflow.keras.layers import BatchNormalization
embedding_dims = 100

X_train, X_test, y_train, y_test = train_test_split(np.array(encoded_docs), np.array(df["loss"]), test_size= ...
es = EarlyStopping(monitor='val_loss', mode='min', verbose=1, restore_best_weights=True, patience = 7)
filepath = './ # change to directory where model is downloaded
print('Build model...')

inputs = Input(shape=(11,), dtype='int32')
embedded_sequences = Embedding(vocab_size,
      embedding_dims,weights=[embedding_matrix],trainable=False)(inputs)
# out = Flatten()(embedded_sequences)
out = Dense(300, activation='relu',
kernel_initializer=initializers.glorot_normal(seed=39)(embedded_sequences)
out = BatchNormalization()(out)
out = Dropout(0.5)(out)
out = Dense(150, activation='relu', kernel_initializer=initializers.glorot_normal(seed=39)(out)
out = BatchNormalization()(out) out = Dropout(0.5)(out)
outputs = Dense(1,activation="linear")(out)

mlp_model = Model(inputs=inputs, outputs=outputs)
print(mlp_model.summary())
mlp_model.compile(loss='mse',optimizer='adam')

print('Train...')
mlp_model.fit(X_train, y_train, batch_size=5000,validation_data=(X_test, y_test), verbose=1,callbacks[es],
      epochs = 300)
```

Build model...
Model: "model"

| Layer (type) | Output Shape | Param # |
|---|---|---|
| input_1 (InputLayer) | [(None, 11)] | 0 |
| embedding (Embedding) | (None, 11, 100) | 5412700 |
| dense_8 (Dense) | (None, 11, 300) | 30300 |
| batch_normalization_8 (BatchNormalization) | (None, 11, 300) | 1200 |
| dropout (Dropout) | (None, 11, 300) | 0 |
| dense_9 (Dense) | (None, 11, 150) | 45150 |
| batch_normalization_9 (BatchNormalization) | (None, 11, 150) | 600 |
| dropout_1 (Dropout) | (None, 11, 150) | 0 |
| dense_10 (Dense) | (None, 11, 1) | 151 |

Total params: 5,490,101
Trainable params: 76,501
Non-trainable params:5,413,600

331c  341c  351c  361c

Figure 5:
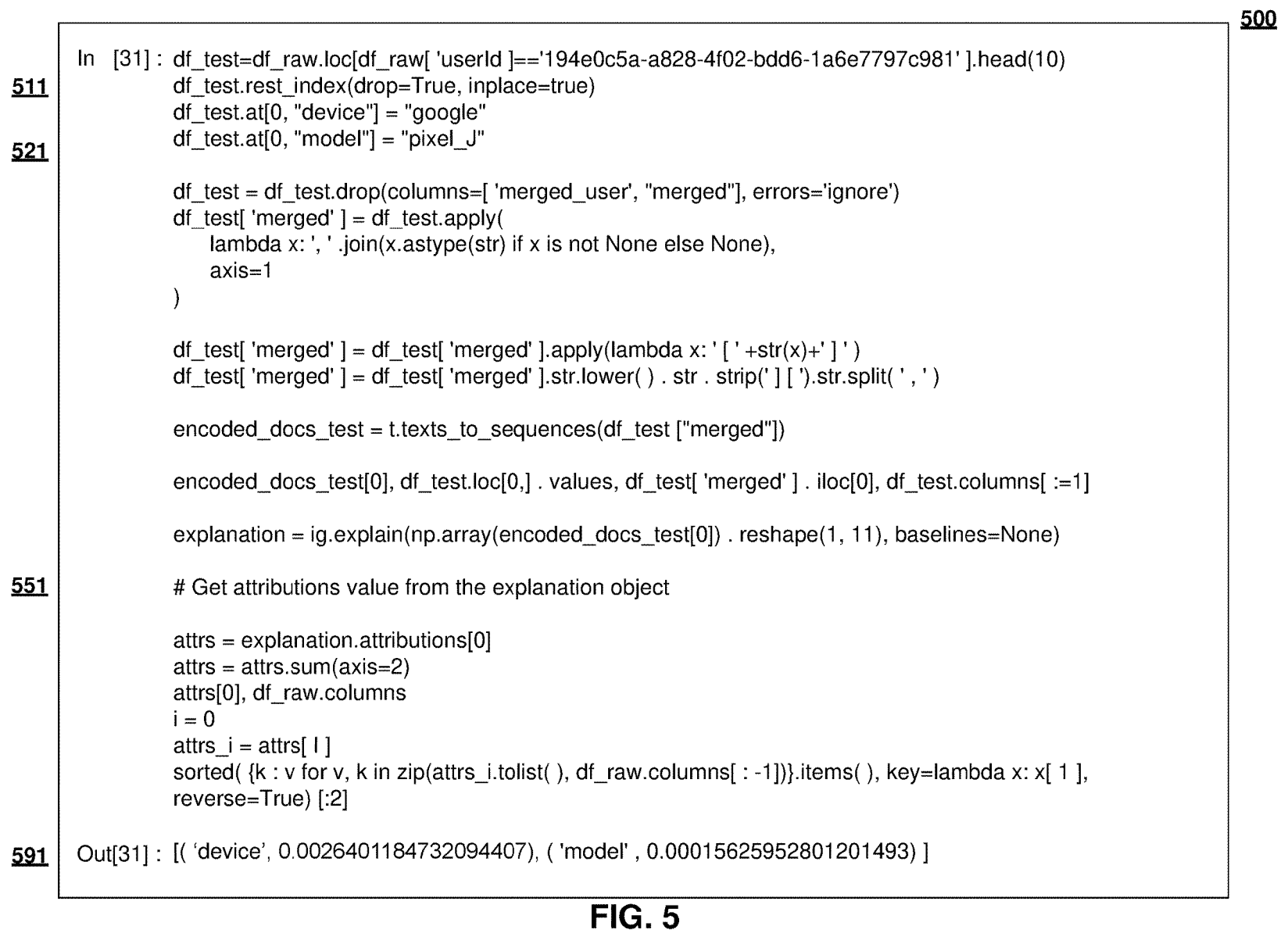

500

```
In [31] : df_test=df_raw.loc[df_raw['userId']=='194e0c5a-a828-4f02-bdd6-1a6e7797c981'].head(10)
          df_test.rest_index(drop=True, inplace=true)
          df_test.at[0, "device"] = "google"
          df_test.at[0, "model"] = "pixel_J"

df_test = df_test.drop(columns=['merged_user', "merged"], errors='ignore')
          df_test['merged'] = df_test.apply(
              lambda x:', '.join(x.astype(str) if x is not None else None),
              axis=1
          )

df_test['merged'] = df_test['merged'].apply(lambda x:' [ ' +str(x)+' ] ' )
          df_test['merged'] = df_test['merged'].str.lower() . str . strip(']['). str.split(' , ' )

encoded_docs_test = t.texts_to_sequences(df_test ["merged"])

encoded_docs_test[0], df_test.loc[0,] . values, df_test['merged'] . iloc[0], df_test.columns[ :=1]

explanation = ig.explain(np.array(encoded_docs_test[0]) . reshape(1, 11), baselines=None)

Get attributions value from the explanation object attrs = explanation.attributions[0]
          attrs = attrs.sum(axis=2)
          attrs[0], df_raw.columns
          i = 0
          attrs_i = attrs[ I ]
          sorted( {k : v for v, k in zip(attrs_i.tolist( ), df_raw.columns[ : -1])}.items( ), key=lambda x: x[ 1 ],
          reverse=True) [:2]
```

Out[31] : [( 'device', 0.0026401184732094407), ( 'model' , 0.00015625952801201493) ]

```
from tensorflow.keras.layers import Input, Dense, Embedding, Conv1D, GlobalMaxPooling1D, Dropout
filters = 250
kernel_size = 3
hidden_dims = 250
hidden_dims_2=100
max_length=11
inputs = Input(shape=(max_length,), dtype='int32')
embedded_sequences = Embedding(vocab_size,
                embedding_dims,weights=[embedding_matrix],
                embedding_dims,
                weights=[embedding_matrix],
                trainable=False)(inputs)

out = Conv1D(filters, kernel_size, padding='valid', activation='relu', strides=1)(embedded_sequences)
out = Dropout(0.4)(out)
out = GlobalMaxPooling1D() (out) #TODO globalaveragepooling, padding & kernel
out = Dense(hidden_dims, activation='relu')(out)
out = Dropout(0.2)(out)
out = Dense(hidden_dims, activation='relu')(out)
out = Dropout(0.4)(out)outputs = Dense(1,activation="linear")(out)
cnn_model = Model(inputs=inputs, outputs=outputs)print(cnn_model.summary())
cnn_model.compile(loss='mae',optimizer='adam')
print('Train...')
cnn_model.fit(X_train, y_train,
            batch_size=256,
            validation_data=(X_test, y_test),
            verbose=1, callbacks[es], epochs=300)
```

Figures 7A, 7B:
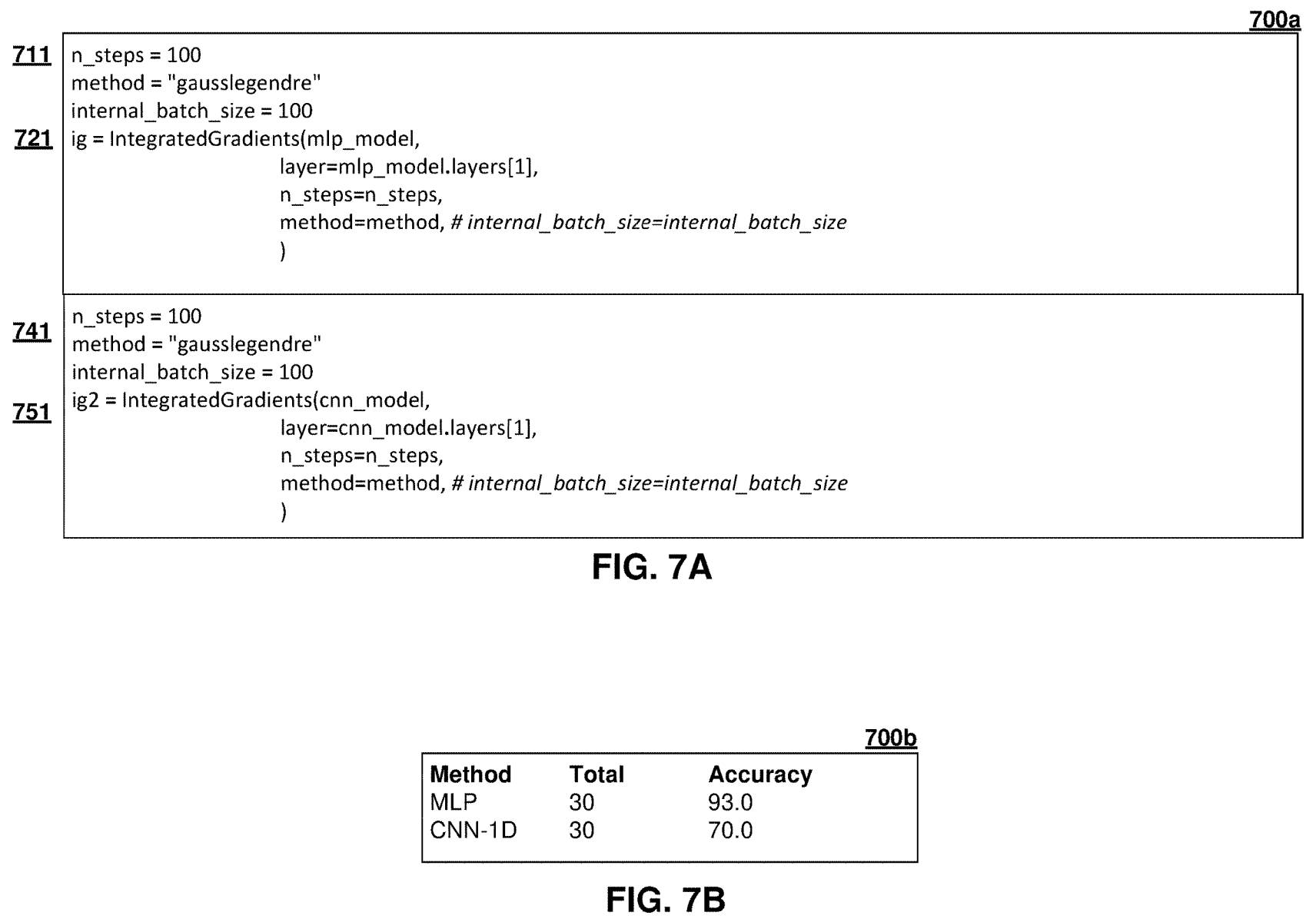

711
```
n_steps = 100
method = "gausslegendre"
internal_batch_size = 100
```

721
```
ig = IntegratedGradients(mlp_model,
        layer=mlp_model.layers[1],
        n_steps=n_steps,
        method=method, # internal_batch_size=internal_batch_size
        )
```

741
```
n_steps = 100
method = "gausslegendre"
internal_batch_size = 100
```

751
```
ig2 = IntegratedGradients(cnn_model,
        layer=cnn_model.layers[1],
        n_steps=n_steps,
        method=method, # internal_batch_size=internal_batch_size
        )
```

| Method | Total | Accuracy |
|--------|-------|----------|
| MLP | 30 | 93.0 |
| CNN-1D | 30 | 70.0 |

Figure 9A:
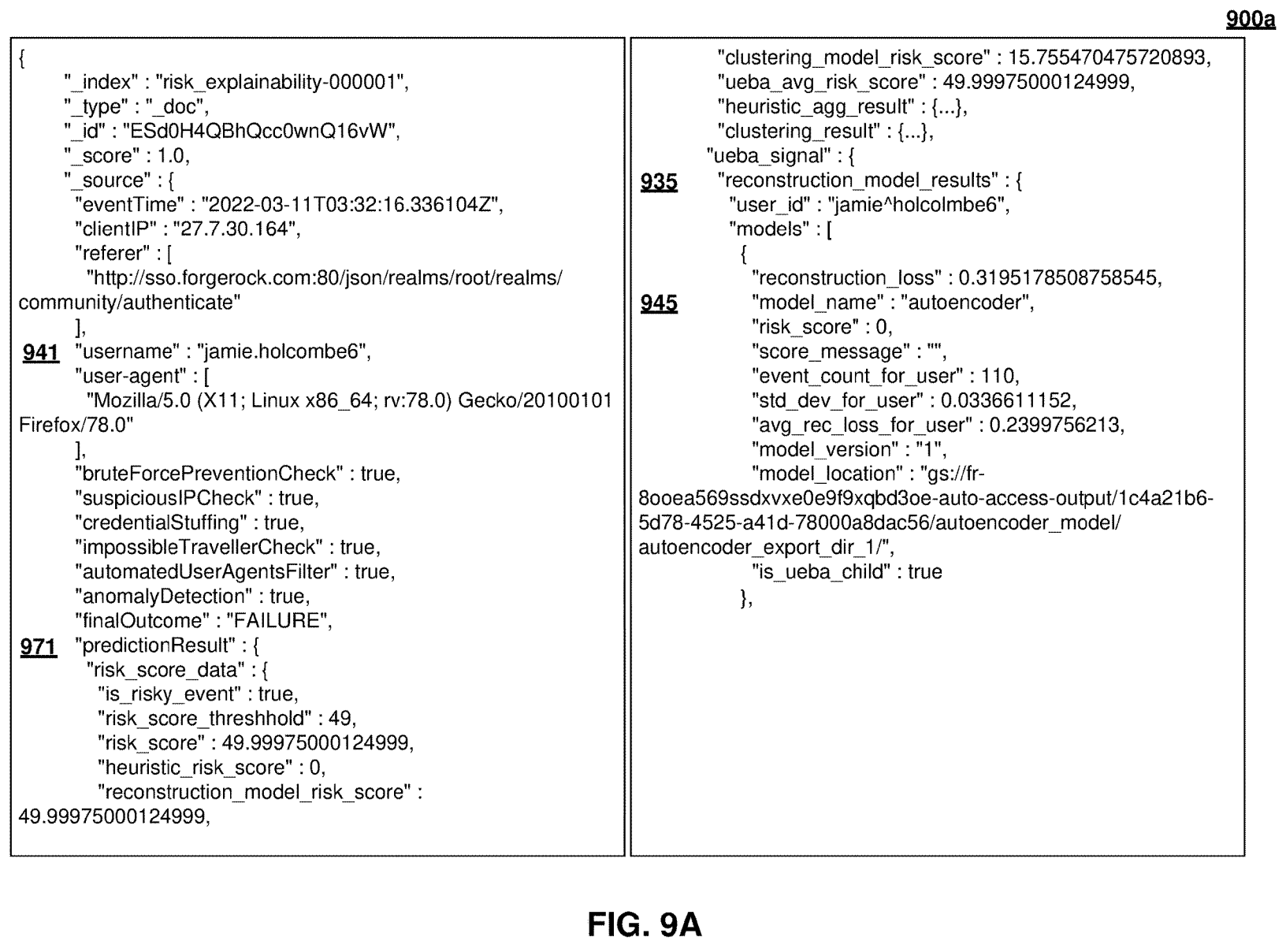

{
"index" : "risk_explainability-000001",
"_type" : "_doc",
"_id" : "ESd0H4QBhQcc0wnQ16vW",
"_score" : 1.0,
"_source" : {
"eventTime" : "2022-03-11T03:32:16.336104Z",
"clientIP" : "27.7.30.164",
"referer" : [
"http://sso.forgerock.com:80/json/realms/root/realms/
community/authenticate"
],
941 "username" : "jamie.holcombe6",
"user-agent" : [
"Mozilla/5.0 (X11; Linux x86_64; rv:78.0) Gecko/20100101
Firefox/78.0"
],
"bruteForcePreventionCheck" : true,
"suspiciousIPCheck" : true,
"credentialStuffing" : true,
"impossibleTravellerCheck" : true,
"automatedUserAgentsFilter" : true,
"anomalyDetection" : true,
"finalOutcome" : "FAILURE",
971 "predictionResult" : {
"risk_score_data" : {
"is_risky_event" : true,
"risk_score_threshold" : 49,
"risk_score" : 49.9997500000124999,
"heuristic_risk_score" : 0,
"reconstruction_model_risk_score" :
49.9997500000124999, "clustering_model_risk_score" : 15.75547047572089,
"ueba_avg_risk_score" : 49.9997500000124999,
"heuristic_agg_result" : {...},
"clustering_result" : {...},
"ueba_signal" : {
935 "reconstruction_model_results" : {
"user_id" : "jamie^holcolmbe6",
"models" : [
{
"reconstruction_loss" : 0.3195178508758545,
"model_name" : "autoencoder",
945 "risk_score" : 0,
"score_message" : "",
"event_count_for_user" : 110,
"std_dev_for_user" : 0.0336611152,
"avg_rec_loss_for_user" : 0.2399756213,
"model_version" : "1",
"model_location" : "gs://fr-
8ooea569ssdxvxe0e9f9xqbd3oe-auto-access-output/1c4a21b6-
5d78-4525-a41d-78000a8dac56/autoencoder_model/
autoencoder_export_dir_1/",
"is_ueba_child" : true
},

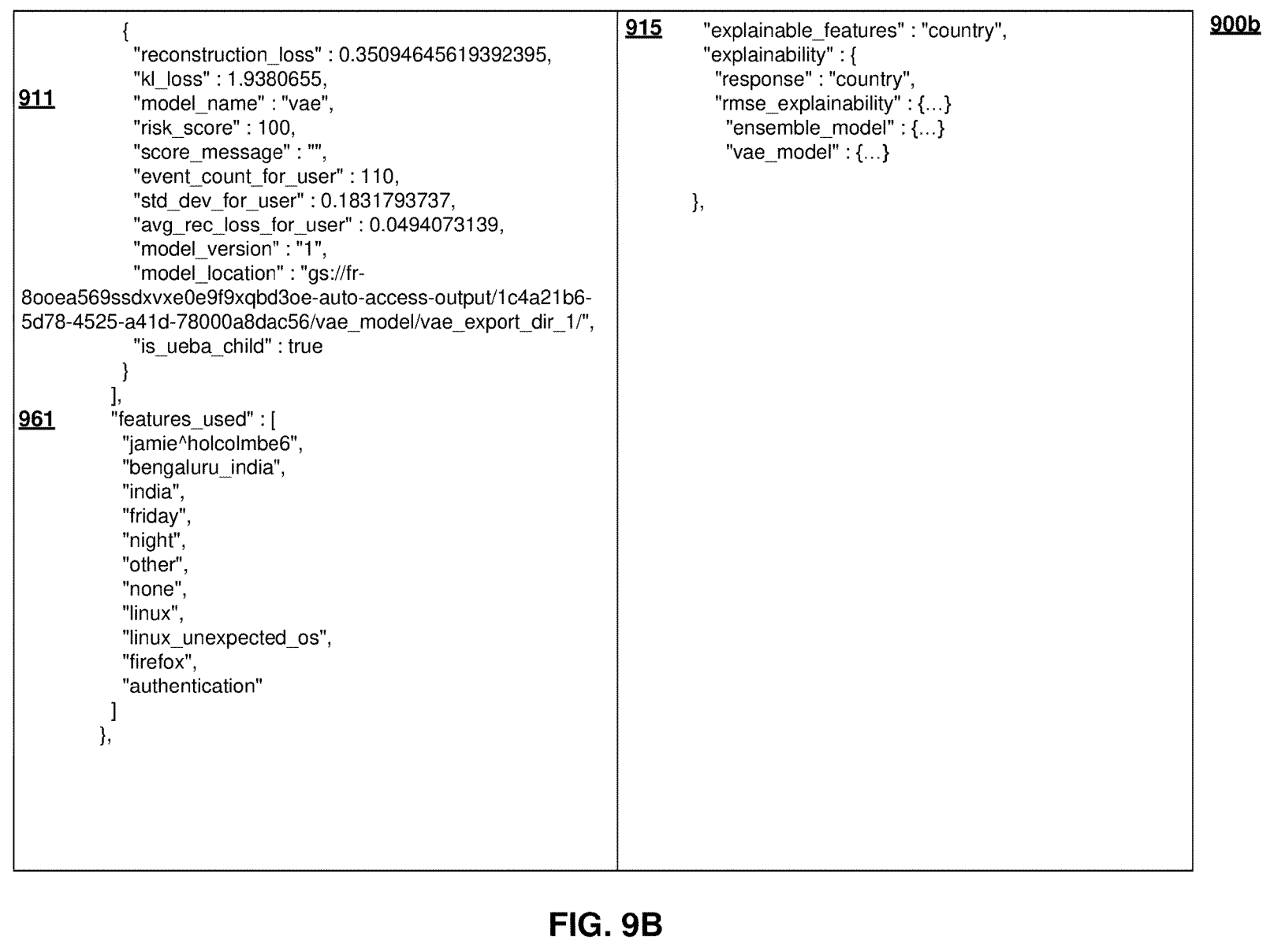

"explainable_features" : "country",
"explainability" : {
  "response" : "country",
  "rmse_explainability" : {...}
  "ensemble_model" : {...}
  "vae_model" : {...}
},

911

{
  "reconstruction_loss" : 0.35094645619392395,
  "kl_loss" : 1.9380655,
  "model_name" : "vae",
  "risk_score" : 100,
  "score_message" : "",
  "event_count_for_user" : 110,
  "std_dev_for_user" : 0.1831793737,
  "avg_rec_loss_for_user" : 0.0494073139,
  "model_version" : "1",
  "model_location" : "gs://fr-8ooea569ssdxvxe0e9f9xqpd3oe-auto-access-output/1c4a21b6-5d78-4525-a41d-78000a8dac56/vae_model/vae_export_dir_1/",
  "is_ueba_child" : true
}
],

961

"features_used" : [
  "jamie^holcolmbe6",
  "bengaluru_india",
  "india",
  "friday",
  "night",
  "other",
  "none",
  "linux",
  "linux_unexpected_os",
  "firefox",
  "authentication"
]
},

FIG. 9B

EXPLAINABLE NEURAL NETWORK FOR ANOMALY DETECTION

RELATED APPLICATION(S)

This application is related to the following commonly owned applications:

U.S. patent application Ser. No. 18/139,290 titled "Step-Up Authentication Conditioned On Risk Score Explainability," filed on 25 Apr. 2023; and U.S. patent application Ser. No. 18/139,296 titled "Access Prediction Service Serving Explainable Risk Scores," filed on 25 Apr. 2023; and U.S. patent application Ser. No. 18/139,295 titled "Access Prediction Service Receiving Authentication Journey Characteristics For Supervised Learning," filed on April 2023.

INCORPORATIONS

The following materials are incorporated by reference for all purposes as if fully set forth herein:

Bojanowski, Pitor et al., Enriching Word Vectors with Subword, *Transactions of the Association for Computational Linguistics* (2017) 5: 135-146, Bojanowski, Pitor et al., "Enriching Word Vectors with Subword Information," 1 Jun. 2017, hereinafter Bojanowski.

Kingma, Diederik P et al., Auto-Encoding Variational Bayes[v11], 2022, arXiv: 1312.6114, hereinafter Kingma.

Sundararajan, Mukund et al., Axiomatic Attribution for Deep Networks, *Proceedings of the 34th International Conference on Machine Learning*, PMLR Vol 70, pages 3319-3328, 2017, hereinafter Sundararajan.

TECHNICAL FIELD

The technical field relates to computer security and explaining artificial intelligence decisions and more specifically to explaining neural network detection of an anomaly in an authentication request.

BACKGROUND

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

An unfortunate characteristic of neural network classifiers is that they are considered a "black box" when it comes to their predictions. In other words, although a neural network can provide highly accurate classification of input, it is often difficult to know why the neural network decided that classification. When the neural network provides a result that is different than a security administrator's expectation, the black box nature of neural networks makes it hard for the administrator, who needs to take some action, to determine whether to trust the neural network's result over the administrator's own judgement.

The lack of neural network transparency can be a challenge when deciding how to act on detected anomalies in computer network authentication requests. It is desirable to use neural networks to detect anomalies in authentication requests due to their high accuracy. However, the lack of transparency prevents the administrator from making good decisions whether to override the neural network's findings.

Explanation tools exist that can explain supervised models to clients as part of the field of Explainable AI (XAI). For example, Google has a project called Vertex AI that purports to provide explainability. However, results often sacrifice accuracy in favor of explainability.

An opportunity arises for explaining an anomaly detected by an unsupervised encoder-decoder model while retaining accuracy of neural-network generated results. Improved results may ensue.

SUMMARY

The technology disclosed relates to explaining an anomaly detected in an authentication request by an unsupervised anomaly detection model, such as an encoder-decoder model. The technology involves obtaining the unsupervised encoder-decoder model, the encoder-decoder model having been trained to detect anomalous authentication requests. The technology also involves obtaining an explanation model, such as a multi-layer perceptron (MLP) model, trained to provide MLP results similar to encoder-decoder results when the same features are provided to both the unsupervised encoder-decoder model and the MLP model. The encoder-decoder results serve as ground truth during the MLP model training in the disclosed technology, which also includes embedding authentication request features from a live authentication request into an embedding space to generate embedding features, and providing the embedding features to the encoder-decoder model. The technology further involves detecting, by the encoder-decoder model, that the live authentication request is anomalous, and based on the detecting of anomaly, providing the embedding features to an explanation tool using the MLP. The disclosed technology further includes obtaining, from the explanation tool, an explanation comprising at least an identification of the authentication request feature that contributed most to the detecting of anomaly.

Particular aspects of the technology disclosed are described in the claims, specification and drawings.

BRIEF DESCRIPTION OF THE DRAWINGS

In the drawings, like reference characters generally refer to like parts throughout the different views. The drawings are not to scale, with an emphasis instead generally being placed upon illustrating the principles of the technology disclosed. Likewise, any computer code excerpts from more extensive schema or program are provided for the purpose of illustration and are merely examples. In the following description, various implementations of the technology disclosed are described with reference to the following drawings.

FIG. 3B illustrates an example of code, used to build and train the multi-layer perceptron.

FIG. 5 lists a code segment usable for explanation of a detected anomaly by a variational autoencoder, using an associated multi-layer perceptron model within integrated gradients.

FIG. 6 illustrates code to build and train a 1-dimensional convolutional neural network as an example alternative to an MLP model as the explanation model.

FIG. 7A illustrates code for a multi-layer perceptron in integrated gradients and a 1-dimensional convolutional neural network in integrated gradients.

FIG. 7B lists a comparison of the accuracy of testing multi-layer perceptron in integrated gradients and a 1-dimensional convolutional neural network in integrated gradients.

FIG. 9A illustrates the beginning of an explanation.

FIG. 9B continues illustrating the explanation.

DETAILED DESCRIPTION

Figure 1:
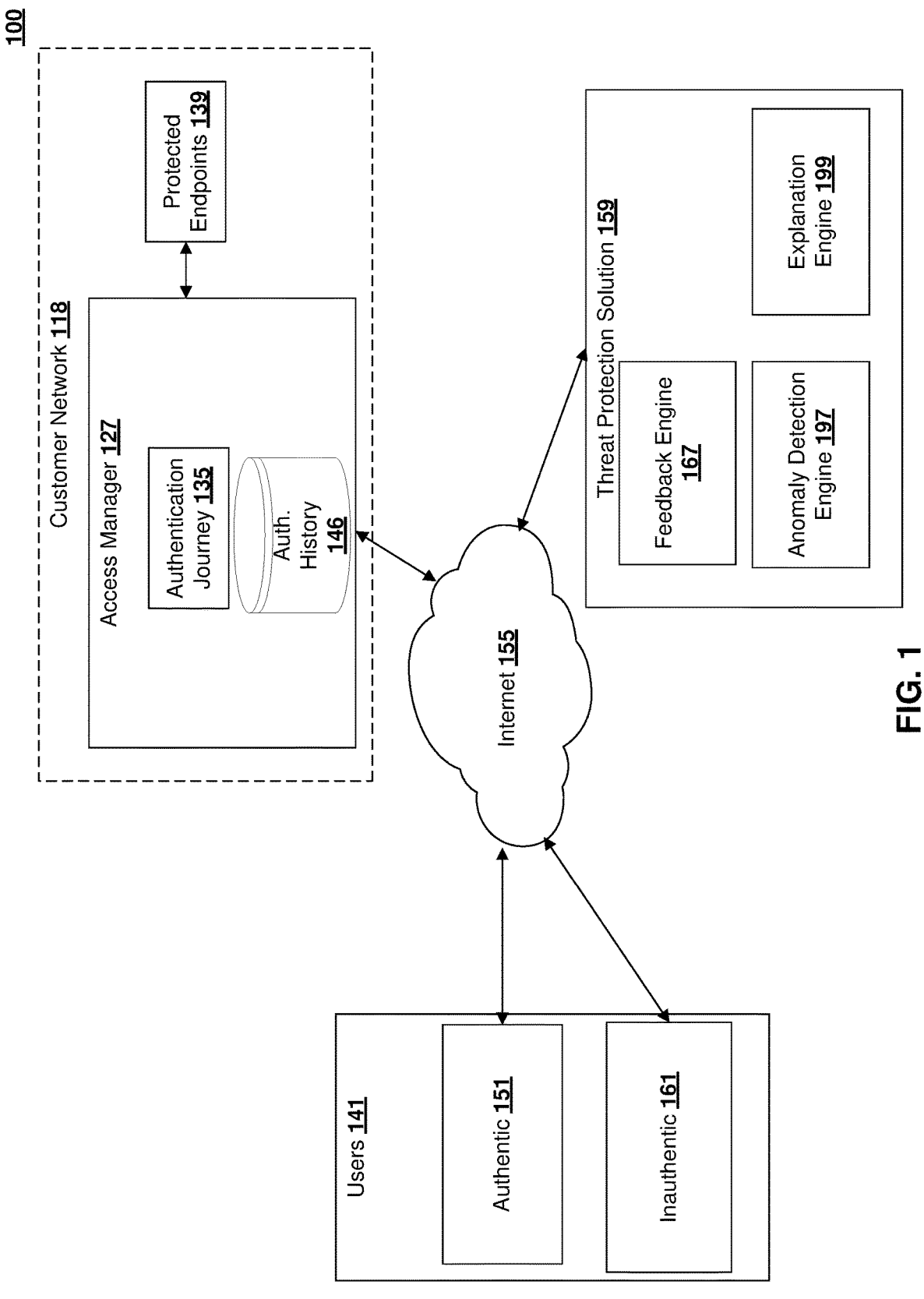
FIG. 1 illustrates an architecture for explaining an anomaly detected by an unsupervised encoder-decoder model, according to one implementation of the disclosed technology.

The following detailed description is made with reference to the figures. Example implementations are described to illustrate the technology disclosed, not to limit its scope, which is defined by the claims. Those of ordinary skill in the art will recognize a variety of equivalent variations on the description that follows.

One way to safeguard protected endpoints on a communication network is determining if an authentication request, which meets the base authentication requirements (e.g., a correct userID/password pair, or a valid bearer token), is made in an anomalous context. In one example of anomalous context, a user that usually authenticates from Alexandria, VA requests authentication from a different city. When an access request is made from an anomalous context, it is often prudent to require step-up authentication (e.g., asking security questions or asking the user to input a security code sent to her phone.)

Step-up authentication can be annoying to users, especially when computer network administrators know, or should know, that the user is expected to authenticate in that anomalous context (e.g., user works from home from Chantilly, VA one day a week). It is desirable to set network rules and policies to account for expected anomalies to maintain a high level of network security through step-up while avoiding unnecessary requiring step-up for predictable anomalous authentication requests. For example, if a network security administrator understands that the user is expected to generate authentication requests in a different city, the security administrator can set rules and policies accordingly.

Neural networks, a broad class of machine learning models that are amenable to training by either unsupervised learning or supervised learning, are well-suited for anomaly detection due to their high accuracy. Neural networks "train" a series of layers of weighted nodes and weighted edges to model optimal solutions in multi-dimensional solution spaces. However, it can be difficult to obtain accurate feature attribution from neural networks, so security administrators might not be able to determine whether the detected anomaly was based on an expected anomaly (different city), or an unexpected anomaly (e.g., different country). Without accurate feature attribution, it is difficult to craft responsive rules and policies about step-up authentication, thus foiling the goal of not frustrating users.

The disclosed technology involves an explanation model, such as Multi-layer perceptron (MLP) or 1D Convolutional Neural Network (1D CNN), trained to parallel the loss function (e.g., a Kullback-Leibler divergence) of an anomaly detection neural network that is trained to detect anomalies in use cases such as authentication requests. This technology converts an unsupervised training problem into a supervised training problem since the explanation model undergoes supervised learning based on the anomaly detection neural network. The technology permits highly accurate feature attribution while retaining high accuracy of anomaly detection during production.

Acronyms

Acronyms used in this disclosure are identified the first time that they are used. These acronyms are terms of art, often used in standards documents. Except where the terms are used in a clear and distinctly different sense than they are used in the art, we adopt the meanings found in security system environments. For the reader's convenience, many of them are listed here:

| | |
|---|---|
| 1D CNN | 1-Dimensional Convolutional Neural Network |
| AE | AutoEncoder |
| CNN | Convolutional Neural Network |
| IG | Integrated Gradients |
| LIME | Local Interpretable Model-agnostic Explanations |
| MLP | Multi-Layer Perceptron |
| QII | Quantitative Input Influence |
| SHAP | SHapley Additive exPlanations |
| VAE | Variational AutoEncoder |

Next, we describe an architectural diagram for explaining an anomaly detected by an unsupervised encoder-decoder model, using a threat protection solution to supplement an authentication journey Architecture FIG. 1 illustrates an architecture for explaining an anomaly detected by an unsupervised encoder-decoder model. Because FIG. 1 is an architectural diagram, certain details are intentionally omitted to improve clarity of the description. The discussion of FIG. 1 will be organized as follows. First, the elements of the figure will be described, followed by their interconnections. Then, the use of the elements in the system will be described in greater detail.

System 100 includes users 141, authentic customer network 118, threat protection solution 159 and internet 155. Users 141 include authentic users 151 and inauthentic users 161. Customer network 118 includes access manager 127, authentication journey 135, protected endpoints 139 and authentication history 146. Threat protection solution 159 includes feedback engine 167, anomaly detection engine 197 and explanation engine 199.

Users 141 are attempting to access protected endpoints 139 hosted on customer network 118. Users 141 include authentic user 151 (who are supposed to have access to protected endpoints 139) and inauthentic users 161 (who are not supposed to have access to protected endpoints 139).

Customer network 118 has policies designed to admit only authentic users 151 and deny inauthentic users 161. Access manager 127 enforces those policies by filtering between the authentication requests from authentic users 151 and inauthentic users 161. Access manager 127 performs the filtering by sending users 141 through authentication journeys 135. Although the example of system 100 illustrates access manager 127 as part of customer network 118, in some implementations, access manager 127 can also be hosted on the cloud. Examples of products suitable to serve as access manager 127 is ForgeRock Access Management and ForgeRock Identity Platform. Other vendors can also have products providing user authentication and/or enforce policies related to user authentication, and those products fall within the ambit of an access manager 127.

Authentication journey 135 provides a series of interactions with users 141 and based on those interactions, determines whether to facilitate access to protected endpoints 139. Authentication journey 135 governs interactions such as username/password, bearer-token based SSO, new user registration and step-up authentication. Authentication journey 135 can also employ data of prior authentication attempts from authentication history store 146 to determine how authentication requests from users 141 should be routed. Authentication journey 135 can also use feedback from threat protection solution 159 to help determine authentication request routing.

Authentication history store 146 can store information from one or more tenants into tables of a common database image to form an on-demand database service (ODDS), which can be implemented in many ways such as a multi-tenant database system (MTDS). A database image can include one or more database objects. In other implementations, the databases can be relational database management systems (RDBMSs), object-oriented database management systems (OODBMSs), distributed file systems (DFS), no-schema database, or any other data storing systems or computing devices. In some implementations, the gathered metadata is processed and/or normalized.

Protected endpoints 139 are communication endpoints that the customer owning customer network 118 wishes to protect. Examples of protected endpoints 139 include applications, services and resources.

Threat protection solution 159 can host several services, amongst which is anomaly detection engine 197, that provide authentication-request related analysis to predict the risk that an authentication request originates from inauthentic user 161 rather than authentic user 151. One example of a product suitable to serve as threat protection solution 159 is ForgeRock Autonomous Access. Other products, from other network security vendors, that can detect anomalous authentication requests fall within the ambit of this disclosure.

Feedback engine 167 can assemble and report feedback related to whether an anomaly was detected. Feedback provided by feedback engine includes at least a risk score generated by anomaly detection engine 197 and can also include an explanation of the risk score generated by explanation engine 199.

Anomaly detection engine 197 provides a risk score that the access request, ostensibly from authentic user 151, originated from an anomalous context. Anomaly detection engine 197 can use a variety of approaches, that include one or more neural networks such as encoder-decoder neural networks, to determine the risk score. Anomaly detection engine 197 can use the neural networks as part of an ensemble. Implementations of anomaly detection engine

197 using an ensemble can include, but are not limited to, heuristic rules, other types of machine learning models such as cluster models (e.g., centroid clustering, density clustering, distribution clustering, hierarchy clustering) and regression models.

Explanation engine 199 can explain the result of anomaly detection engine 197 by providing the features that contributed most to the result. The explanation can include a quantity of features. The quantity can be preset, or can be set on demand. The quantity can be set to a single feature, or set to a quantity greater than 1 (e.g., top 3 features).

Internet 155 (aka "cloud") is a network connecting computers that are remote from one another. Internet 155 can span the Earth or a single country.

While system 100 is described herein with reference to particular blocks, it is to be understood that the blocks are defined for convenience of description and are not intended to require a particular physical arrangement of component parts. Further, the blocks need not correspond to physically distinct components. To the extent that physically distinct components are used, connections between components can be wired and/or wireless as desired. The different elements or components can be combined into single software modules and multiple software modules can run on the same processors.

Moreover, this technology can be implemented using two or more separate and distinct computer-implemented systems that cooperate and communicate with one another. This technology can be implemented in numerous ways, including as a process, a method, an apparatus, a system, a device, a computer-readable medium such as a computer-readable storage medium that stores computer-readable instructions or computer program code, or as a computer program product comprising a computer usable medium having a computer readable program code embodied therein. The technology disclosed can be implemented in the context of any computer-implemented system, including a database system or a relational database implementation like an Oracle™ compatible database implementation, an IBM DB2 Enterprise Server™ compatible relational database implementation, a MySQL™ or PostgreSQL™ compatible relational database implementation, or a Microsoft SQL Server™ compatible relational database implementation or a NoSQL non-relational database implementation such as an Apache Cassandra™ compatible non-relational database implementation, a BigTable™ compatible non-relational database implementation or an HBase™ or DynamoDB™ compatible non-relational database implementation. Next, we discuss embedding input into an embedding space.

Embedding is the technique of representing data to points in a continuous space ("embedding space"), such that points in embedding space that are close together are semantically related. Embedding can encode categorical values into the embedding space such that algorithms designed to work on continuous variables (e.g., most machine learning models) can be applied to data sets where some or all of the features are categorical.

One example of an embedding algorithm is fastText. FastText was designed to create embedding spaces from literal words by using subword structures. Detailed discussion of fastText can be found in "Enriching Word Vectors with Subword Information," herein "Bojanowski," which is incorporated by reference in its entirety herein. The following discussion is an overview of fastText based on Bojanowski.

FastText builds a subword model for each word. To do so, fastText first pads each word within a corpus of word sequences with beginning and ending characters (in Bojanowski, these are represented by the characters '<' and '>'. See Bojanowski at page 137). Then, fastText extracts n-grams within a set range of n from the padded words. Each n-gram of each word has an associated vector representation. Each word also has a vector representation. Using the example of the fastText process on the word "there," and for n-grams of size G=3, the word is first padded in special characters, resulting in <there>. The n-grams of the word "there" are <th, the, her, ere and re>, and also includes the padded word itself <there>. To save memory, the n-grams are hashed into a limited set of buckets.

FastText scores pairs of words (target word and context word) by taking the summation of the products of each n-gram vector for a target word and a context word vector. More formally:

$$s(w, c) = \sum_{g \in G_w} z_g^t v_c$$

where s is the scoring function, w is a target word at position t, c is a context word that surrounds w, g is an n-gram of w, $G_w$ is the set of n-grams associated with w, $$z_g^t$$

is the vector representation of g at position t and $v_c$ is the vector representation of the context word. Scoring between words not only occurs between words and positive context words, but also uses samples of negative context words for each positive context word.

fastText trains the model using stochastic gradient descent on the negative log likelihood function:

$$\log\left(1 + e^{-s(w_t, w_c)}\right) + \sum_{m \in N_{t,c}} \log\left(1 + e^{s(w_t, m)}\right)$$

where m is a negative example and $N_{t,c}$ is a set of sampled negative context words for $w_t$.

Although the process of implementing fastText is presented using the example of literal words, extending the example to categorical data would be understood by those skilled in the art. Referring to the ongoing example of anomaly detection in authentication requests, individual authentication requests can be characterized by features, examples of which include geographical country (e.g., "India"), geographical city (e.g., "Hyderabad), device (e.g., "Google"), model (e.g., "Pixel 3") day of week (e.g., "Thursday"), part of day (e.g., "morning"), OS (e.g., "Windows"), OS version (e.g., "Windows 7") and browser (e.g., "Firefox"). All of the example features are categorical data. A history of authentication requests can be treated as a text corpus, each request can treated as a sentence, and each feature value can be treated as a word.

Besides fastText, other examples of embedding algorithms include one-hot encoding, Principal Component Analysis, Singular Value Decomposition, Latent Semantic Indexing, Word2Vec, GloVe, Embeddings from Language and Model, Bidirectional Encoder Representations from Transformers and many more.

Once threat protection solution 159 has performed embedding, the dimensions of the embedding space ("embedding features") are used as features, instead of features from authentication request ("authentication request feature") to train ML models during a training phase and as input to ML models during a production phase.

Next, we discuss an example encoder-decoder model, Variational Autoencoder, that can be used as part of anomaly detection engine 197.

Figure 2:
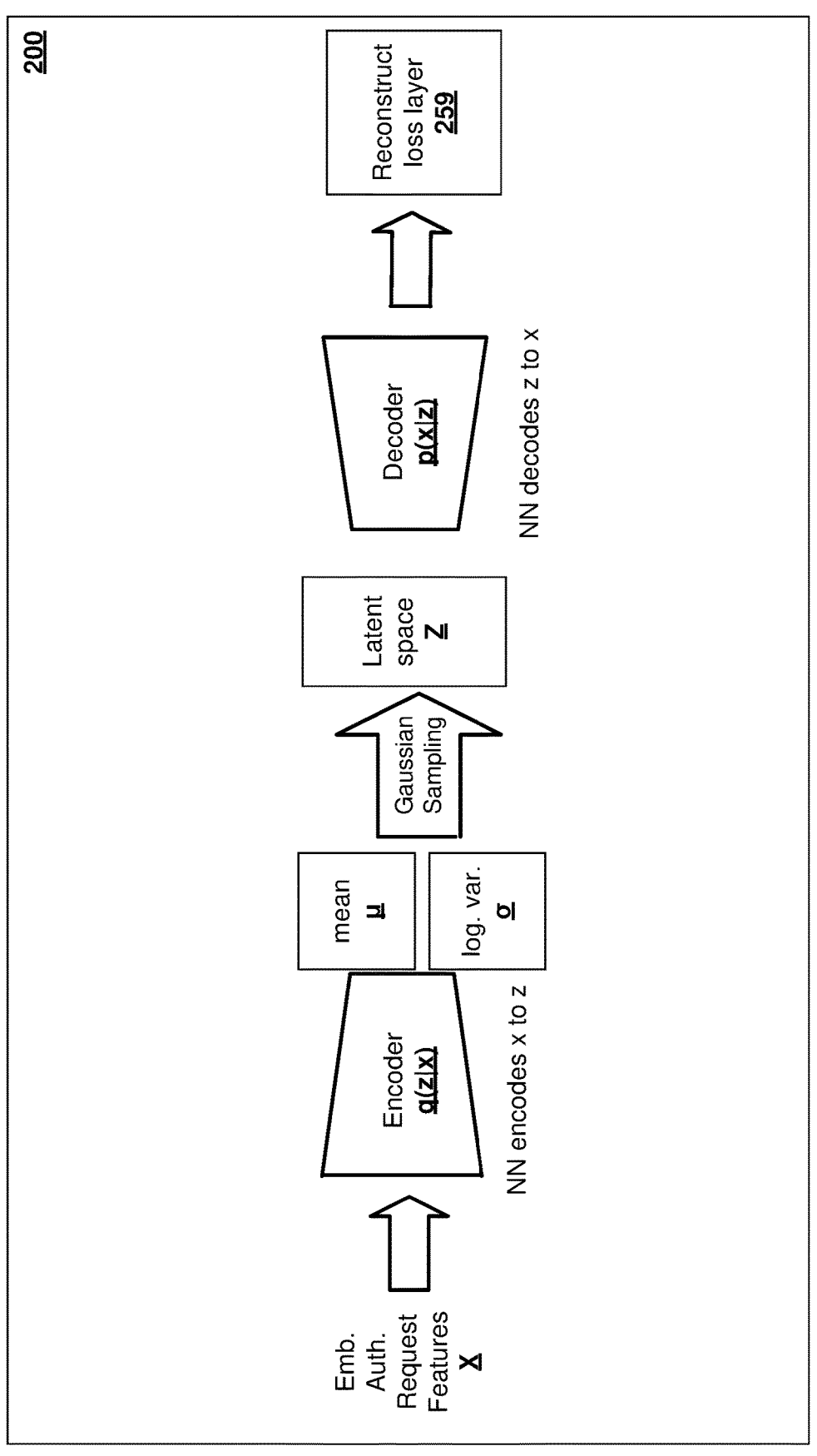
FIG. 2 illustrates a Variational Autoencoder usable as an anomaly detection model.

FIG. 2 illustrates a Variational Autoencoder usable as an anomaly detection model. VAE 200 is example of an auto-encoder encoder-decoder model which optimizes an approximation of the posterior (which can be intractable) using a Variational Bayes approach and is part of an ongoing example of an anomaly detection model usable by anomaly detection engine 197 to classify authentication requests as anomalous or non-anomalous. VAE 200 includes embedded authentication request features X, encoder q(z|x), latent space Z, mean µ, variance σ, decoder p(x|z), reconstruction loss layer 259.

Bayesian inference is a class of techniques that update probability of a hypothesis as more evidence becomes available. A marginal likelihood is a distribution of observed data, represented as a likelihood function that is integrated over the space of the possible parameter values that could define a particular mathematical model. Sometimes, the marginal likelihood function includes an integral that is intractable. Variational Bayesian methods are a family of Bayesian techniques for approximating intractable integrals, such as Expectation Maximation (EM), or mean-field approximation. Sometimes, EM and mean-field algorithms also cannot be used.

VAE 200 can be used when the marginal likelihood function is intractable and known workarounds to the marginal likelihood function are also intractable. Detailed discussion of VAE can be found in "Auto-Encoding Variational Bayes," (herein "Kingma") which is incorporated by reference in its entirety herein. The following discussion is overview of VAE based on Kingma and the figure includes many reference characters similar to symbols used in Kingma. Authentication request features are embedded into n dimensions using fastText embedding to obtained embedded authentication request features x. In one example, n is one hundred. In other examples, n can be set to other values and this adjustment can affect training speed and/or model accuracy. Encoder q(z|x) uses embedded authentication request features x as input and predicts mean p and variance a of the logarithmic distribution in latent space for each feature. Since the marginal likelihood function can be intractable, VAE 200 approaches this problem by recognition model q(z|x) where z is an unknown distribution and x are discrete variables in that distribution. The recognition model, encoder q(z|x), has the role of the encoder model of in an AE. Decoder p(x|z) samples from the latent space distributions, based on mean p and variance a and generates a vector representing latent space Z. In the instant example, VAE 200 performs sampling with Gaussian sampling because authentication request features are continuous data. In some implementations, VAE 200 can also be used with the Bernoulli distribution when features are binary. Decoder p(x|z) attempts to recreate the input based on these samples.

VAE 200 can be used when the marginal likelihood function can be intractable and known workarounds to the marginal likelihood function are also intractable. Detailed discussion can be found in Kingma.

Continuing the description of VAE 200, the difference between the input and output is the reconstruction loss that is determined by reconstruction loss layer 259. During training, the reconstruction loss is used to adjust the parameters using the "reparameterization trick" during back propagation. During production, the reconstruction loss is used to estimate anomaly and contributes to the risk score. Libraries used to implement VAE 200 are "TensorFlow" Python package and "Gensim." An implementation of this technology used TensorFlow version 2.7.0 and Gensim 3.8.3. In the implementation, authentication request features from the VAE input layer were embedded into one hundred dimensions with fastText. In the implementation, he encoder and decoder each had two layers of one hundred nodes, and the latent space had fifty nodes. Next, is an example of a multi-layer perceptron neural network that can mirror the input and reconstruction loss of the VAE.

Figure 3A:
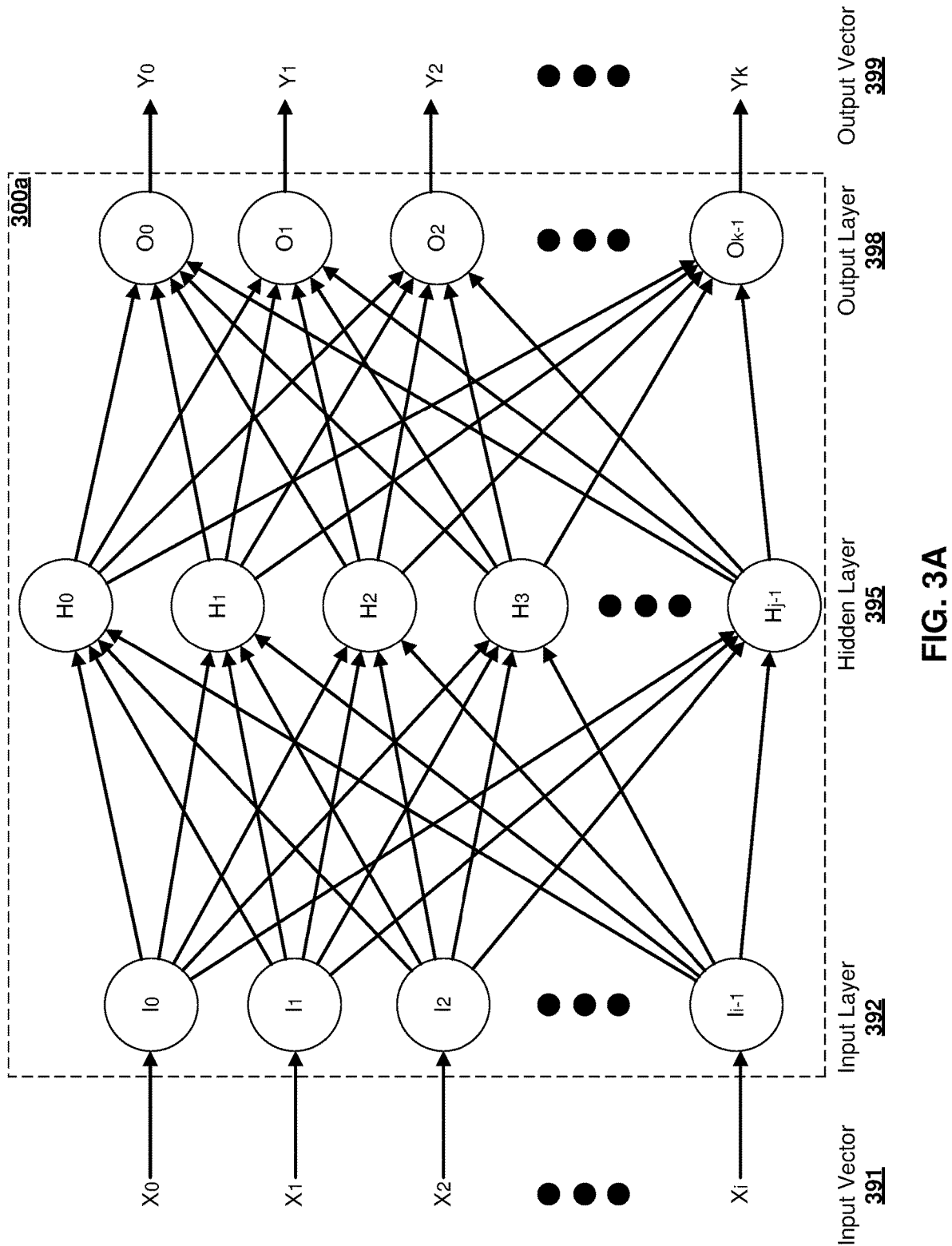
FIG. 3A illustrates a multi-layer perceptron neural network usable as an explanation model.

FIG. 3A illustrates a multi-layer perceptron neural network usable as an explanation model. In general, Multi-Layer Perceptrons (MLPs) are fully connected neural networks. In an ongoing example, MLP 300a is an explanation model trained to provide the same reconstruction loss as anomaly detection model VAE 200 when provided input that is identical to the input provided to VAE 200. Explanation engine 199 performs feature attribution on MLP 300a to generate an explanation of why VAE 200 detected an anomaly. MLP 300a includes input vector X 391, input layer 1392, hidden layer H 395, output layer O 398 and output vector Y 399.

Input vector X is 391 is a feature vector of length i containing feature values. In the example, the features are authentication request features. The features of input vector X 391 are sent to the input layer 1392. In the example, input vector X 391 is the same n dimensions of features created by fastText embedding as VAE 200 input.

Input layer 1392 has i nodes. Each node I has a bias weight that biases the input. For each node I, the biased value is transmitted through the edges to each of j nodes to the next layer, the first layer of hidden layer H 395. Each edge is a weighted edge that further modifies the biased value.

Hidden layer H 395 is represented as a single hidden layer in FIG. 3 to keep the illustration simple. In practice, hidden layer 395 can have more than one hidden layer of nodes. Each layer of hidden layer H 395 comprises nodes, each node having a bias weight. When the first layer of hidden layer H 395 receives values in its j nodes, each of the j nodes first calculates the weighted sum of the received value, then biases the weighted sum and finally transmits the biased value to each node in the next layer through weighted edges.

If hidden layer H 395 has only a single layer, then the next layer is output layer O 395. If the next layer is another hidden layer, then the next layer is the second layer of hidden layer H 395 and the summation/bias/transmit cycle repeats until all layers of hidden layer H 395 are exhausted.

Output layer 398 receives values from the last layer of hidden layer H 395 and performs a weighted sum and bias. The use of the resulting output value differs depending on whether the neural network is being trained or being used in production.

During training, the error based on the difference between the expected results and output layer 398 are propagated backwards to adjust weights based on the gradient of the error function with respect to the error of output layer values, using a process called "back propagation." Starting at the output layer and working backwards, the bias values and weight values are adjusted based on the contribution of those values to the error of the next layer. During production, the results of output layer O 398 are stored in output vector 399.

Libraries used to implement MLP 300a are "TensorFlow" Python package and "Gensim. An implementation of this technology used TensorFlow version 2.7.0 and Gensim 3.8.3. In the implementation, authentication request features from the MLP input layer were embedded into one hundred dimensions with fastText. In other implementations, other libraries can be used. Next, we describe training an MLP.

FIG. 3B illustrates an example of code, used to build and train the multi-layer perceptron. Code 300b includes input layer code 331, hidden layer 1 code 341, hidden layer 2 code 351, output layer code 361, summary code 371 and training code 381.

Executing code 300b builds an MLP and trains the MLP using training data. Input layer code 331 provides eleven features to the model. Hidden layer 1 code 341 defines the first hidden layer to have three hundred nodes and uses a ReLU activation function. Hidden layer 2 code 351 defines the second hidden layer to have one hundred fifty nodes and uses a ReLU activation function. Output layer code 361 defines the output layer to have a single node and uses a linear activation function. Summary code 371 generates a summary of each layer, which is discussed later with respect to FIG. 3C. Training code 381 trains the build MLP model. Code 300b uses Keras, a high-level API in the TensorFlow 2.7.0 library.

In one example, when an execution of code 300b reached training code 381, code 300b produced the output including the following:

```
Train . . .
Epoch 1/300
58/58 [==============]-96s 2s/step - loss: 1.4393 -
val_loss: 0.0436
Epoch 2/300
58/58 [==============]-95s 2s/step - loss: 1.4997 -
val_loss: 0.0335
Epoch 3/300
58/58 [==============] - 94s 2s/step - loss: 0.1943 -
val_loss: 0.0162
. . .
Epoch 16/300
58/58 [==============] - 90s 2s/step - loss: 0.0057 -
val_loss: 0.0053
Epoch 17/300
58/58 [==============] - 100s 2s/step - loss: 0.0057 -
val_loss: 0.0053
Epoch 18/300
58/58 [==============] - 100s 2s/step - loss: 0.0057 -
val_loss: 0.0053
Epoch 19/300
58/58 [==============] - ETA: 0s - loss: 0.0057
Restoring model weights from the
end of the best epoch: 16.
58/58 [==============] - 100s 2s/step - loss: 0.0057 -
val_loss: 0.0053
Epoch 00019: early stopping
```

Each row reports the training observations used over the total size of the training set, time that the identified epoch took to run, the value of cost function for the training data and the value of cost function for the cross-validation data.

In training, MLP 300a accepts the same input as used for VAE 200, with the goal of reproducing the same output as VAE 200. In production, output values between MLP 300a and VAE 200 are similar, as described relative to FIG. 3A. MLP 300a training output values are similar in two potential conditions: (a) the preset number of epochs is exhausted during the training phase, or (b) successive epochs fall within a tolerance that causes early termination of the training phase. Next, we describe a summary of the layers generated by code 300b.

Figure 3C:
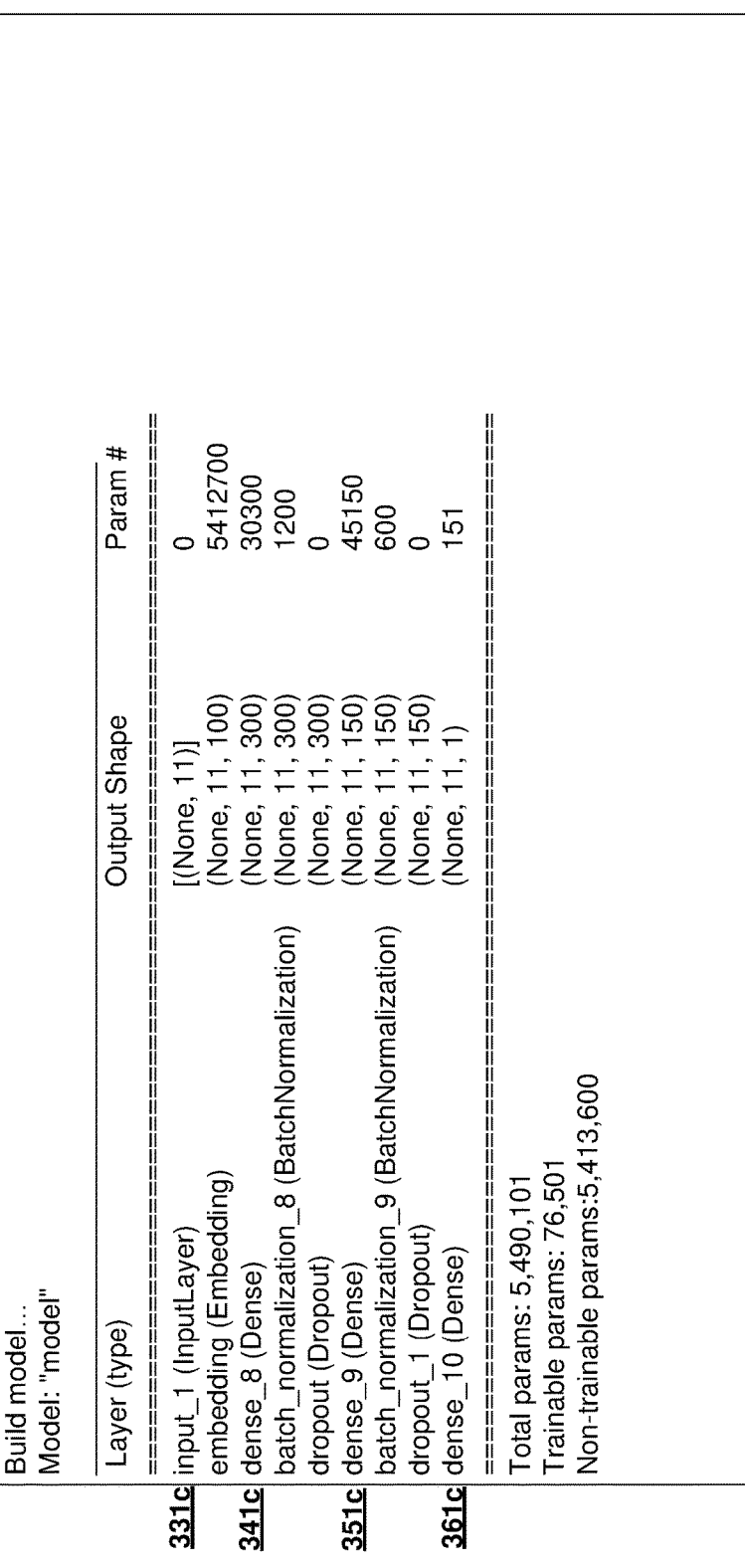
FIG. 3C illustrates a summary of the layers generated by code for building a multi-layer perceptron.

FIG. 3C illustrates a summary of the layers generated by code for building a multi-layer perceptron. Summary 300c includes input layer summary 331c, hidden layer 1 summary 341c, hidden layer 2 summary 351c and output layer summary 361c.

Summary 300c is Keras output reflecting a built MLP model, generated when executing code 300b. Each row in summary 300c corresponds to a layer built by a line of code 300b. Layer refers to a type of layer in the MLP model. "Output Shape," for layers other than the input layer, is a tuple reflecting the output of each layer. For example, the output shape of hidden layer 1 summary 341c is a 3-tuple of <batch size, 11 columns, 300 nodes>. Param # is the number of parameters, at the respective layer, that are changeable during training. For example, hidden layer 1 341 has 100 input weights from the embedding layer and 1 additional bias weight for each node. (100 input layer inputs+1 bias weight input)×300 nodes equals 30,300 parameters.

Total params is the sum of all parameters that could be trained in param #. Trainable params are the parameters that were updated during back propagation. Non-trainable params are the parameters that are not updated per the gradient during back propagation (although they could be updated for other reasons).

Next, we describe Integrated Gradients (IG), an explainability tool that provides feature attribution to machine learning models such as neural networks. IG compares an input $x_i$ with a baseline input $x_i'$ and calculates gradients of input that are interpolated along the straight-line path from base to the input vector. To help describe IG, the next figure provides plot of one feature out of a model the interpolations of the that feature's values and the resultant scores.

Figure 4:
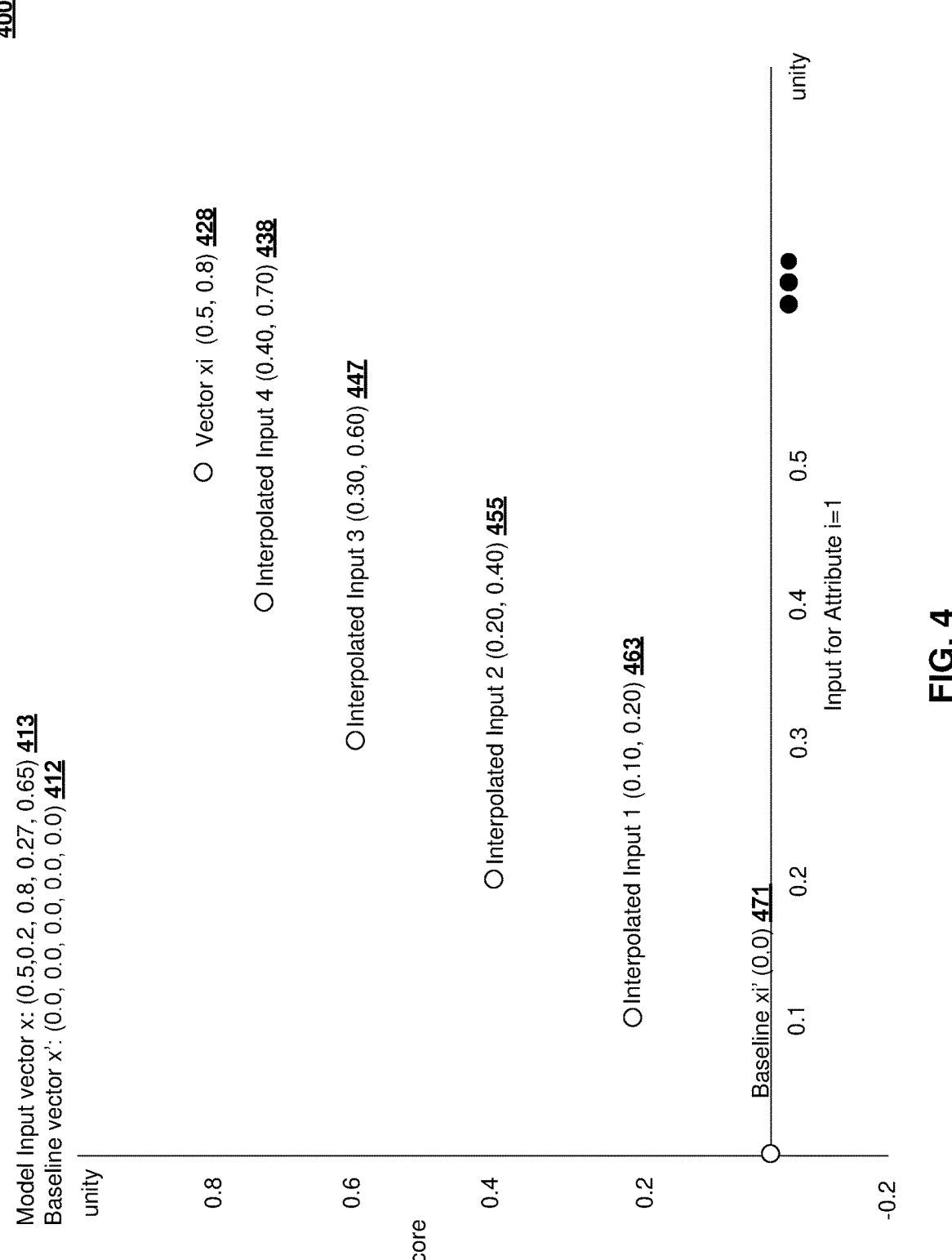
FIG. 4 illustrates the concept of interpolated values of input, as a step of the Integrated Gradients technique usable by an explanation engine.

FIG. 4 illustrates the concept of interpolated values of input, as a step of the Integrated Gradients technique usable by explanation engine 199. IG is a technique for feature attribution that fulfills two feature attribution axioms. See "Axiomatic Attribution for Deep Networks," herein "Sundararajan" and incorporated by reference in its entirety, on page 33120. The axioms are:

Sensitivity: if two inputs only differ by a feature value and lead to different predictions, then the feature has a non-zero attribution.

Implementation invariance: If two models have identical I/O behavior, then the attributions for the models are identical.

Plot 400 contains model input vector 413, baseline vector x' 412, vector $x_i$ 428, baseline $x_i'$ 471, interpolated input 1 463, interpolated input 2 455, interpolated input 3 447 and interpolated input 4 438. The domain axis represents the value that could be entered for the i-th dimension and, for this example, spans 0 to 1. The range axis represents the score the ML model produced ("model score") when given model input vector x 413 and, for this example, spans −1 to 1.

For purposes of this IG discussion, a particular dimension represented by the numerical feature place is the i-th dimension, staring from 1. The quantity of interpolation input vectors used by integrated gradients is m. F is the function representing the ML model.

Model input vector x 413 is a multi-dimensional input vector to the ML model.

In the example presented by plot 400, model input vector 413 is (0.5, 0.2, 0.8, 0.27, 0.65), and i=1. The score produced when model input vector x 413 is input to function F is 0.8. In the example values of vector $x_i$ 428, 0.5 represents the value in the first dimension of model input vector x 413 and 0.8 is the score that the ML model produced using model input vector x 413, so vector $x_i$ 428 is positioned at the cartesian coordinates 0.5, 0.8.

Baseline vector x' 412 is a vector that represents a neutral value. In this example, an input of 0.00 represents no signal and a model score of 0.00 represents a neutral result, so an appropriate baseline vector x' is (0.00, 0.00, 0.00, 0.00, 0.00). Therefore, for i=1, baseline $x_i'$ 471 has the values (0.00, 0.00).

As mentioned above, IG uses interpolated input values to obtain more sample observations from the model and captures those values as some IG input vectors. Those IG input vectors are built across all dimensions in model input x 413, and IG uses the IG input vectors to obtain respective scores. IG also uses x and x' as IG input vectors. This example uses 4 interpolated inputs, so m=6.

Interpolated input 1 463, interpolated input 2 455, interpolated input 3 447 and interpolated input 4 438 are interpolated values for $x_i$ where i=1. The interpolated inputs respectively use values 0.1, 0.2, 0.3, 0.4 for the first feature, and correspond to the respective scores 0.2, 0.4, 0.6, 0.7, thus reaching the interpolated input vectors (0.10, 0.20) for interpolated input 1 463, (0.20, 0.40) for interpolated input 2 454, (0.30, 0.60) for interpolated input 3 447 and (0.40, 0.7) for interpolated input 4 438. In general practice, the value of m is expected to fall between 20 to 300 interpolated inputs to obtain a 95% accuracy, but the relatively scarce number of input values is used here to simplify the example. In some implementations of the technology, m=100.

For i=2, the interpolated inputs between x and x' are 0.04, 0.08, 0.12, 0.16. For i=3, the interpolated inputs are 0.16, 0.32, 0.48, 0.64. In this fashion, across all dimensions, IG creates sample input vectors of five along a straight-line path between model input vector x 413 and baseline vector x' 412.

IG obtains the cumulative gradients at all points along the interpolated vectors and, for each dimension i, obtains a respective score that reflects the contribution of the feature to the model score.

Formally, for a feature represented by a respective dimension i in x and x', $$IG_i = (x_i - x_i') \int_{\alpha=0}^{1} \frac{F(x' + \alpha x(x - x'))}{dx_i} d\alpha$$

IG can be approximated in a manner defined by the following formula, $$IG_i^{approx}(x):: = (x_i - x_i') \sum_{k=1}^{m} \frac{dF\left(x' + \frac{k}{m}(x - x')\right)}{dx_i} \left(\frac{1}{m}\right)$$

As stated above, m is the number of IG input vectors, and as shown here, is the Riemann approximation of the integral.

After IG generates its approximations for each feature, the IG score with the highest magnitude away from the baseline value represents the feature that contributed most to the model score, the IG score with the next highest magnitude away from the baseline value represents the feature that contributed the second-most to the model score and so forth.

Some implementations of the technology use IG on MLP 300a, that was trained to produce similar output as VAE 200, for feature attribute attribution. The axiom of implementation invariance permits the feature attribution of the MLP to also be attributable to the VAE. Next, we present an example of results from an MLP within IG that explains an anomaly detected by VAE from a synthetic anomalous authentication request.

FIG. 5 lists a code segment usable for explanation of a detected anomaly by a variational autoencoder, using an associated multi-layer perceptron model within integrated gradients. Code 500 includes authentication event assignment 511, anomaly generation assignment 521, explanation function 551 and output 591. Authentication event assignment 511 obtains ten login events from a given user identifier. Anomaly generation assignment 521 creates synthetic anomalous data by changing features of the first login event, such that the city feature now has the feature value"hydera-bad" and the country feature now has the feature value "india". Explanation function 651 obtains an explanation based on the MLP that was trained to mirror the reconstruction loss error of a VAE.

Explanation function 551 performs feature attribution using IG. For each feature analyzed by explanation function 551, a positive respective feature attribution score means the feature impacts the prediction positively, and negative feature attribution scores means the feature impacts the prediction negatively. The relative contribution of a feature to the finding of anomaly is measured by the magnitude of the feature.

Output 591 provides two features that contributed to dissimilarity in order of feature importance and their respective feature attribution scores. Here, output 591 identifies the feature "country" as the top contributor to the anomaly. Next, we present code for an explanation model other than MLP.

FIG. 6 illustrates code to build and train a 1-dimensional convolutional neural network as an example alternative to an MLP model as the explanation model. 1D CNN is a type of CNN that slides a "kernel" along one dimension of data. Datasets with spatial properties and 1 dimension of progression (e.g., datasets of time-series data) are suitable for analysis by 1D CNN. Historical authentication requests to access protected resources in a computer network fits that dataset profile.

Code 600 includes embedding layer code 631, 1-dimensional convolutional layer code 641 and global max pooling code 651. Embedding layer code 631 embeds input from the input layer (in the ongoing example, authentication request features) into the embedding space parameterized in the same fashion the models discussed above. 1-dimensional convolutional layer code 641 creates a convolution kernel that is convolved with the layer input over a single spatial (or temporal) dimension and produces a vector (or tensor) of outputs. Global max pooling code 651 down samples the weighted values over the single or temporal dimension.

Although 1D CNN is used as the example alternative to MLP for the explanation model, other models can serve as the explanation model. Other models suitable for the explanation model are those models that are more complex than the anomaly detection model, and therefore can capture the complexities of the solution modeled by the anomaly detection model. Using models suitable for the anomaly detection model as the explanation model fall within the ambit of this disclosure. However, model choice for explanation models can provide different levels of accuracy. Next, we discuss code for comparing an MLP in integrated gradients and a 1D CNN in integrated gradients, to demonstrate the different levels of accuracy.

FIG. 7A illustrates code for a multi-layer perceptron in integrated gradients and a 1-dimensional convolutional neural network in integrated gradients. Code 700a includes IG-MLP interpolation steps 711, IG-MLP execution 721, IG-CNN interpolation steps 741 and IG-CNN execution 751.

IG-MLP interpolation steps 711 and IG-CNN interpolation steps 741 have the same value of one hundred steps. IG-MLP execution 721 and IG-CNN execution 751 share the same parameters, except to their respective model. Thus, the results from testing feature attribution accuracy over the same data can be compared.

Next, we discuss the result of tests on thirty instances of synthetic data representing anomalous access requests.

FIG. 7B lists a comparison of the accuracy of testing multi-layer perceptron in integrated gradients and a 1-dimensional convolutional neural network in integrated gradients. Table 700b shows that testing thirty instances of synthetic authentication requests had different accuracy rates for MLP and 1D CNN.

The synthetic data was created in the same fashion as illustrated above by code 500. Namely, by taking authentication request event features from non-anomalous authentication requests and assigning certain features with new feature values, one can create synthetic authentication requests. The features that were assigned the new feature values are the presumptive cause of anomaly.

As illustrated, MLP within integrated gradients yielded a ninety-three percent accuracy for identifying inaccurate features. By contrast, 1D CNN within integrated gradients yielded only seventy percent accuracy, which still has some predictive value even if not as accurate as MLP. Next, we present a description of a threat protection solution using anomaly detection engine 197 and explanation engine 199 to assemble feedback, using a MLP within IG to evaluate a VAE.

Figure 8:
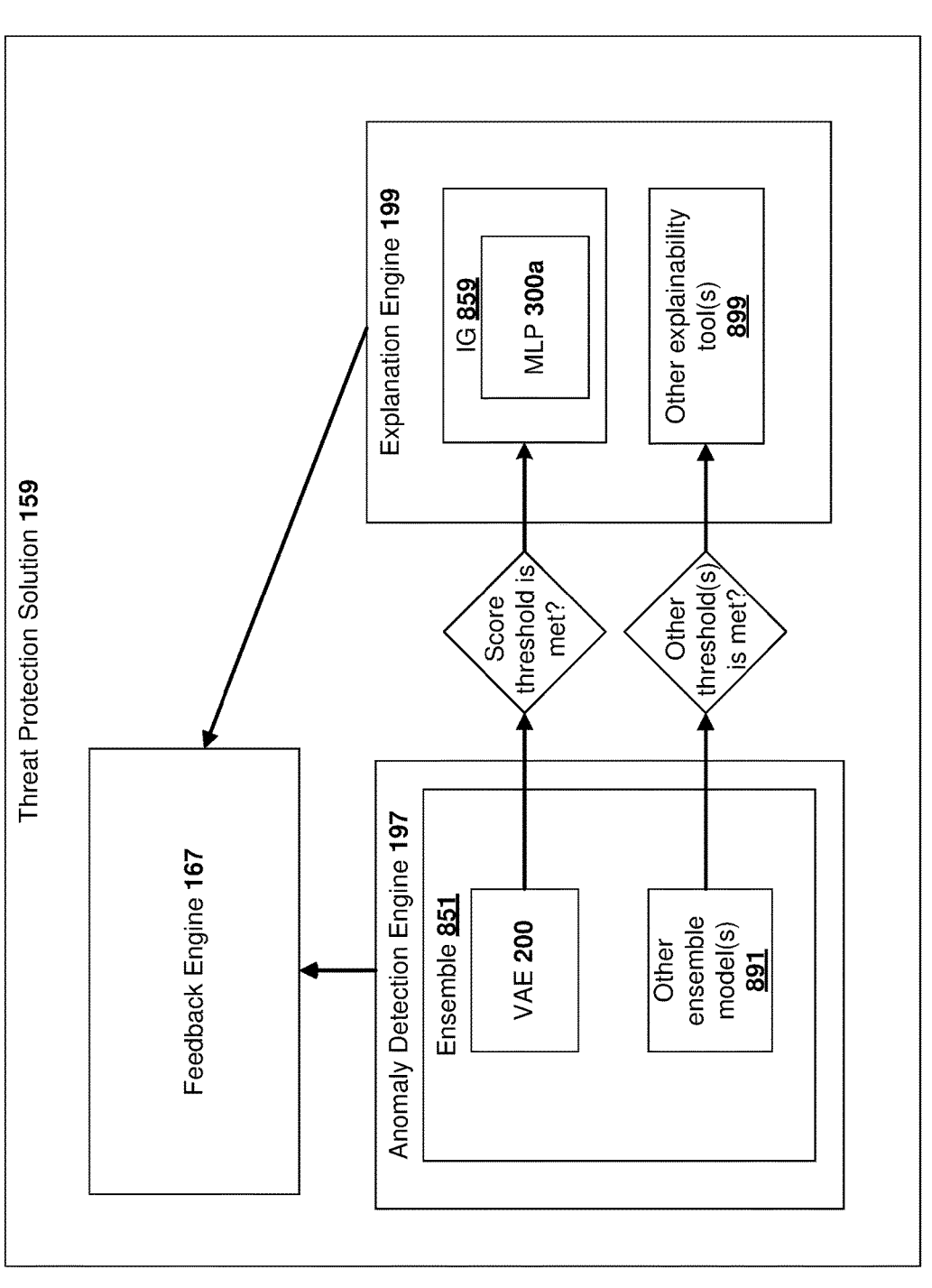
FIG. 8 illustrates a threat protection solution using anomaly detection engine and explanation engine to assemble actionable feedback to authentication journeys.

FIG. 8 illustrates a threat protection solution using anomaly detection engine and explanation engine to assemble actionable feedback to authentication journeys. Block diagram 800 includes ensemble 851, other ensemble model(s) 891, Integrated Gradients (IG) 859, and other explainability tool(s). Block diagram 800 also includes previously introduced threat protection solution 159, feedback engine 167, anomaly detection engine 197, explanation engine 199, VAE 200 and MLP 300a, which are not further discussed in any detail here because they were previously discussed above.

Feedback engine 167 provides at least a risk score generated by anomaly detection engine 197. Feedback engine 167 can also provide one or more explanations, if any are generated by explanation engine 199.

Ensemble 851 is an ensemble of risk scoring approaches that generates a single risk score. In this example, the risk score is scaled between 0 and 100, but other scales or representations of risk are contemplated by this disclosure. Ensemble 851 comprises one or more anomaly detection models such as VAE 200 and other ensemble model(s) 891. Examples of other ensemble model(s) 891 can include neural network models such as AE, clustering models such as k-modes, and other types of classifier models as known in the art.

IG 859 is an explainability tool that performs feature attribution on MLP 300a, which was trained as the explanation model to complement the anomaly detection model VAE 200. For the ongoing example of explaining VAE results, explanation engine 199 is only configured to explain VAE 200 and the VAE explanation is treated as an explanation of the ensemble as a whole.

Other configurations of explanation engine 199 also fall within the ambit of this disclosure. In some implementations where anomaly is detected by other ensemble model(s) 891, explanation engine 199 is configured with other explainability tool(s) 899 corresponding to other ensemble model(s). For example, an AE could be another anomaly detection model that is one of other ensemble model(s) 891. In that example, the technology could also use IG on another MLP trained as an explanation model complimenting the AE. However, the hypothetical another MLP would be distinct than MLP 300a because the hypothetical MLP would be trained specifically as the explanation model for AE as one of other ensemble model(s) 891 and would not necessarily also explain VAE 200.

Other explainability tool(s) 899 is not limited to IG, but can also use other feature attribution techniques as suitable for the complimentary anomaly detection model (e.g., LIME, SHAPley, QII, influence-directed explanations). The other explainability tool(s) 899 can analyze other explanation model(s) beside MLP 300a (not shown in figure).

In tests of explainability tools against an implementation of MLP trained to compliment a VAE, the IG feature attribution technique was found to reach over 90% accuracy, whereas LIME and SHAPley techniques had accuracy rates closer to 60%. For implementations of complementary models other than VAE as the anomaly detection model and MLP as the explanation model, the ambit of this disclosure encompasses explainability tools with at least 70%. In some further implementations, higher thresholds of accuracy, such as at least 80% accuracy, at least 90% accuracy, at least 95% accuracy, at least 99% accuracy, or at least 99.9% accuracy, also fall within the ambit of this disclosure.

VAE 200 is provided embedding feature values which were generated using fastText on the authentication request features of a live authentication request into an embedding space. After processing the embedding features, VAE 200 generates a value used to calculate a risk score that triggers an explainability condition, then anomaly detection engine 197 provides the same input features values to IG 859. In this example, the explainability condition can be a threshold (e.g., 80 on a scale of 0 through 100, 8 out of 10, 4 out of 5, 0.8 out of 1.0, eighty percent, or a similar threshold on any equivalent scale). In some implementations, the threshold can be set as higher or lower value by an administrator. In some implementations, the explainability condition can be a flag setting representing a decision of riskiness. After the explainability condition is met, IG 859 then provides the authentication request feature values to MLP 300a. MLP 300a generates embedding features (by using fastText on the authentication request features of a live authentication request into an embedding space), obtains a baseline vector (or tensor), interpolates input vectors (or tensors), and generates a feature attribution result.

Anomaly detection engine 197 also provides the reconstruction loss of VAE 200 to explanation engine 199. We generate stats (such as mean & standard deviation) of KL loss for the users in the given dataset, when the value of a loss exceeds the mean by three standard deviations, the attribution is very accurate. When the value of a loss does not exceed the mean by three standard deviations, IG 899 is more likely to provide false positive result regarding the feature(s) causing anomaly.

In ensemble implementations where at least some other ensemble model(s) 891 correspond to other explainability tool(s) and a threshold is the explainability condition, thresholds other that for VAE 200 can be used. For example, if other ensemble model(s) 891 includes an AE, and explainability of the AE is also implemented as part of explanation engine 199, an AE specific threshold (e.g., 70 out of a scale of 0 through 100, 7 out of 10, 7/10, or a similar threshold on any equivalent scale) could be the other threshold. In some implementations, the threshold can be set as a higher or lower value by an administrator.

If any explanations are generated by explanation engine 199, those explanations are also provided to feedback engine 167. Regardless of whether any explanations are part of the feedback, feedback engine 167 provides feedback to an authentication journey, such as authentication journey 135. Next, we discuss a demonstration of explanation of a detected anomaly by VAE, using MLP within IG.

FIG. 9A illustrates the beginning of an explanation. Code 900a includes username 941, prediction result 971, User Entity Behavior Analytics (UEBA) model results 935 and autoencoder results 945. Username 941 reports the user identifier of the authentication request. The username has been anonymized to a random name. Prediction result 971 reports on the prediction of an ensemble as a whole. In this example, the prediction found that the overall risk score was 49.99975000124999 and that this event passes the threshold level to be flagged as a risky event. Prediction result 971 also reports the scores from various sets of heuristics and models. UEBA model results 935 reports the results from two neural networks configured to detect anomalies: AE and VAE. UEBA model results 935 includes autoencoder results 945 and results for a VAE model (presented later). Autoencoder results 945 reports the model used is an AE and the risk score produced by the AE. In this example, the risk score is zero. Next, we continue presentation of the explanation.

FIG. 9B continues illustrating the explanation. Code 900b includes example VAE results 911, feature values 961 and explainable features 915. VAE results 911 reports the model used is a VAE and the risk score produced by the VAE. In this example, the risk score is one hundred. Feature values 961 include the feature values of features used by the AE and VAE models. The features presented are userID, city/country, country, day of week, part of day, device, model, OS, OS version, agent and request type. UserID is the username. City/country is the pair of city and country originating the authentication request. Country is the country originating the authentication request. Day of week is the day of the week the authentication request was received. Part of day is the range of time that the authentication request was received. Device is the producing company of the device originating the authentication request. Model is the manufacturer of the device. OS is the name of the operating system on the device. OS version is the version of the OS on the device. Browser is the name of the browser originating the authentication request. Request type is the type of request.

Explainable features 915 include a set of features that contributed most to the VAE's decision that the authentication request is anomalous. Here, the quantity of reported features is preset to 1, and the feature that contributed most is "country." In some embodiments, the quantity of reported features can be more than one. In some embodiments, each reported feature is accompanied by a feature attribution score that reflects the contribution of that feature to the detection of anomaly. The feature attribution score can be used to rank the importance of the feature to detecting the anomaly.

IG is model agnostic, and the full scope of the disclosure includes any ML model trained to anomaly detection as the anomaly detection model and the any ML model trained towards replicating the output of the anomaly detection as the explanation model, if the explanation model is sufficiently complex to capture the anomaly detection model's modeled mathematical function. This disclosure includes the narrow concepts of pairs of matching classes of models (e.g., anomaly detection neural network paired with explanation neural network) and unmatching classes of models (e.g., anomaly detection cluster-model paired with explanation neural network).

The concept of same input and similar output with respect to explanation models relates to the axiom of implementation invariance based on functionally equivalent ML models. See Sundararajan, incorporated by reference, at page 3312[0]. Scaling input values or scaling output values between different models but retaining the same respective meaning falls with the ambit of the concepts "same input and similar output" in the context of the anomaly detection model and the explanation model. Likewise, changing the integer representation of an enumerated type/categorical data falls within the ambit of "same input and similar output" in the context of the anomaly detection model and the explanation model. For example, an authentication request is non-anomalous when sent from the city of Paris, France, and anomalous when sent from the city Paris, Texas. If Paris, Texas is represented by integer value 1 for an anomaly detection model and is represented by integer value 999 for an explanation model, and both models lead to similar output, then they are the "same input" for purposes of this disclosure.

Explainability tools often provide more accurate results when explaining the results obtained using models trained by supervised learning. It is often more difficult to employ explanation tools to models trained by unsupervised learning in a way that preserves feature attribution accuracy.

The disclosed explainability technology stands in contrast to a class of XAI techniques that build parallel models to explain other models, explanation by simplification. Explanation by simplification trains a complimentary neural network using supervised learning to learn the loss of the parent model, but uses a simpler complementary model (simpler, because the complementary model uses fewer layers or fewer nodes) to imitate the input/output of the original model. Explanation by simplification then perform feature attribution on the simpler imitation model. The imitation model is sometimes even be used in production environments in lieu of the original model because, being simpler, the imitation model is computationally cheaper to use than the original model. However, the imitation model, being simpler, sacrifices some degree of anomaly detection accuracy for the sake of explainability.

Rather than sacrifice accuracy of either the feature attribution or the anomaly detection, the disclosed technology both uses the originally trained model in production and also conditionally uses a more complex explanation model. Next, we discuss a 1D CNN that could also be used as an explanation model instead of an MLP.

Computer System

Figure 10:
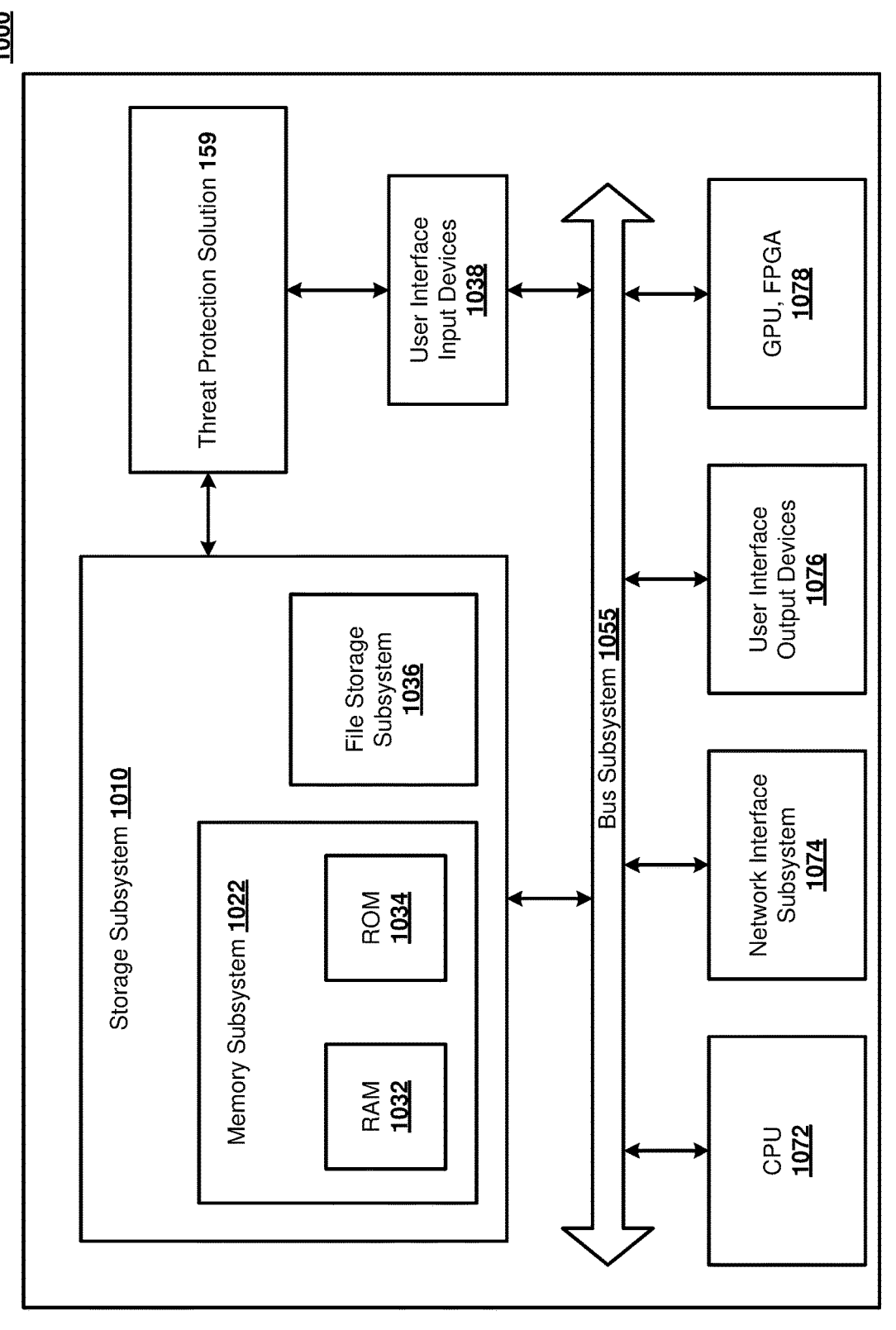
FIG. 10 is a block diagram of an example computer system for explaining an anomaly detected by an unsupervised encoder-decoder model, according to one implementation of the disclosed technology.

FIG. 10 is a simplified block diagram of a computer system 1000 that can be used for implementing a threat protection solution. Computer system 1000 includes at least one central processing unit (CPU) 1072 that communicates with a number of peripheral devices via bus subsystem 1055, and threat protection solution 159 for providing network security services described herein. These peripheral devices can include a storage subsystem 1010 including, for example, memory devices and a file storage subsystem 1036, user interface input devices 1038, user interface output devices 1076, and a network interface subsystem 1074. The input and output devices allow user interaction with computer system 1000. Network interface subsystem 1074 provides an interface to outside networks, including an interface to corresponding interface devices in other computer systems.

In one implementation, threat protection solution 159 of FIG. 1 is communicably linked to the storage subsystem 1010 and the user interface input devices 1038.

User interface input devices 1038 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 1000.

User interface output devices 1076 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 1000 to the user or to another machine or computer system.

Storage subsystem 1010 stores programming and data constructs that provide the functionality of some or all of the modules and methods described herein. Subsystem 1078 can be graphics processing units (GPUs) or field-programmable gate arrays (FPGAs).

Memory subsystem 1022 used in the storage subsystem 1010 can include a number of memories including a main random access memory (RAM) 1032 for storage of instructions and data during program execution and a read only memory (ROM) 1034 in which fixed instructions are stored. A file storage subsystem 1036 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 1036 in the storage subsystem 1010, or in other machines accessible by the processor.

Bus subsystem 1155 provides a mechanism for letting the various components and subsystems of computer system 1000 communicate with each other as intended. Although bus subsystem 1155 is shown schematically as a single bus, alternative implementations of the bus subsystem can use multiple busses.

Computer system 1000 itself can be of varying types including a personal computer, a portable computer, a workstation, a computer terminal, a network computer, a television, a mainframe, a server farm, a widely-distributed set of loosely networked computers, or any other data processing system or user device. Due to the ever changing nature of computers and networks, the description of computer system 1000 depicted in FIG. 11 is intended only as a specific example for purposes of illustrating the preferred embodiments of the present disclosed technology. Many other configurations of computer system 1000 are possible having more or less components than the computer system depicted in FIG. 10.

Some Particular Implementations

We describe various implementations of explaining an anomaly detected by an unsupervised encoder-decoder model.

The technology disclosed can be practiced as a system, method, or article of manufacture. One or more features of an implementation can be combined with the base implementation. Implementations that are not mutually exclusive are taught to be combinable. One or more features of an implementation can be combined with other implementations. This disclosure periodically reminds the user of these options. Omission from some implementations of recitations that repeat these options should not be taken as limiting the combinations taught in the preceding sections—these recitations are hereby incorporated forward by reference into each of the following implementations.

A method implementation explaining an anomaly detected in an authentication request by a classifier includes obtaining the unsupervised encoder-decoder model, the encoder-decoder model having been trained to detect anomalous authentication requests. The method further includes obtaining a multi-layer perceptron (MLP) model trained to provide MLP results similar to encoder-decoder results when the same features are provided to both the unsupervised encoder-decoder model and the MLP model, wherein during the MLP model training, the encoder-decoder results served as ground truth. The method further includes embedding authentication request features from a live authentication request into an embedding space to generate embedding features. The method further providing the embedding features to the encoder-decoder model. The method further includes detecting, by the encoder-decoder model, that the live authentication request is anomalous. The method further includes based on the detecting of anomaly, providing the authentication request features to an explanation tool using the MLP. And the method further includes obtaining, from the explanation tool, an explanation comprising at least an identification of the authentication request feature that contributed most to the detecting of anomaly.

This method implementation and other methods disclosed optionally include one or more of the following features. Methods can also include features described in connection with systems and articles of manufacture disclosed. In the interest of conciseness, alternative combinations of method features are not individually enumerated. Features applicable to systems, methods, and articles of manufacture are not repeated for each statutory class set of base features. The reader will understand how features identified in this section can readily be combined with base features in other statutory classes.

In some implementations, the MLP model is trained by providing, as input, the input to the encoder-decoder model, and targeting, as output, a reconstruction loss error of the encoder-decoder model.

In some implementations, the explanation tool is integrated gradients (IG).

In some implementations, the encoder-decoder model is a variational autoencoder (VAE).

In some implementations, the encoder-decoder model is an autoencoder.

In some implementations, the MLP is a fully connected neural network.

In some implementations, the anomaly is reflected by a risk score from the encoder-decoder model, and an explainability condition is satisfied when the risk score exceeds a threshold. In some further implementations, the explainability condition is a threshold means for evaluating risk, the threshold means set as at least 70 of 100. In some further implementations, the explainability condition is a threshold means for evaluating risk, the threshold means set as at least 80 of 100. In some further implementations, the explainability condition is set by an administrator.

In some implementations, the explanation tool is at least one of Local Interpretable Model-Agnostic Explanations (LIME), SHapley Additive exPlanation (SHAP), Quantitative Input Influence (QII), or Influence-directed explanations.

In some implementations, each authentication request feature in the explanation is paired with a score and the score reflects a degree of contribution to the detecting by the encoder-decoder model. In some further implementations, a magnitude of the score reflects the degree of contribution.

In some implementations, the encoder-decoder model is further provided a UserID, and the MLP is further provided with the UserID.

In some implementations, the method further includes providing the explanation to an authentication tool that is facilitating an authentication journey.

In some implementations, the explanation is capable of facilitating an automatic determination whether to require step-up authentication.

In some implementations, the embedding features were generated using fastText embedding.

Other implementations may include a non-transitory computer readable storage medium storing instructions executable by a processor to perform functions of the system described above.

The implementation includes a non-transitory computer readable storage medium impressed with computer program instructions to explain an anomaly detected in an authentication request by a classifier, the instructions, when executed on a processor, implement a method comprising obtaining the unsupervised encoder-decoder model, the encoder-decoder model having been trained to detect anomalous authentication requests. The method further includes obtaining a multi-layer perceptron (MLP) model trained to provide MLP results similar to encoder-decoder results when the same features are provided to both the unsupervised encoder-decoder model and the MLP model, wherein during the MLP model training, the encoder-decoder results served as ground truth. The method further includes embedding authentication request features from a live authentication request into an embedding space to generate embedding features. The method further providing the embedding features to the encoder-decoder model. The method further includes detecting, by the encoder-decoder model, that the live authentication request is anomalous. The method further includes based on the detecting of anomaly, providing the authentication request features to an explanation tool using the MLP. And the method further includes obtaining, from the explanation tool, an explanation comprising at least an identification of the authentication request feature that contributed most to the detecting of anomaly.

Each of the features discussed in this particular implementation section for the first method implementation apply equally to this non-transitory computer readable storage medium implementation. As indicated above, all the non-transitory computer readable storage medium features are not repeated here and should be considered repeated by reference.

A system implementation of the technology disclosed includes one or more processors coupled to memory. The memory is loaded with computer instructions to explain an anomaly detected in an authentication request by a classifier, the instructions, when executed on the processors, implement actions comprising obtaining the unsupervised encoder-decoder model, the encoder-decoder model having been trained to detect anomalous authentication requests. The actions include obtaining a multi-layer perceptron (MLP) model trained to provide MLP results similar to encoder-decoder results when the same features are provided to both the unsupervised encoder-decoder model and the MLP model, wherein during the MLP model training, the encoder-decoder results served as ground truth. The actions include embedding authentication request features from a live authentication request into an embedding space to generate embedding features. The actions include providing the embedding features to the encoder-decoder model. The actions include detecting, by the encoder-decoder model, that the live authentication request is anomalous. The actions include, based on the detecting of anomaly, providing the authentication request features to an explanation tool using the MLP. And the actions include obtaining, from the explanation tool, an explanation comprising at least an identification of the authentication request feature that contributed most to the detecting of anomaly.

Each of the features discussed in this particular implementation section for the first method implementation apply equally to this system implementation. As indicated above, all the system features are not repeated here and should be considered repeated by reference.

We claim as follows:

1. A method of explaining an anomaly detected in an authentication request by a classifier, the method comprising:

obtaining an unsupervised encoder-decoder model, the encoder-decoder model having been trained to detect authentication requests;

obtaining a multi-layer perceptron (MLP) model trained to provide MLP results similar to encoder-decoder results when the same features are provided to both the unsupervised encoder-decoder model and the MLP model, wherein the encoder-decoder results served as ground truth during the MLP model training, the MLP model is trained by providing, as input, the input to the encoder-decoder model, and targeting, as output, a reconstruction loss error of the encoder-decoder model;

embedding authentication request features from an authentication request into an embedding space to generate embedding features;

providing the embedding features to the encoder-decoder model;

detecting, by the encoder-decoder model, that the authentication request is anomalous, the anomaly is reflected by a risk score from the encoder-decoder model, and an explainability condition is satisfied when the risk score exceeds a threshold;

responsive to the detecting the authentication request as anomalous, providing the authentication request features to an explanation tool using the MLP model; and obtaining, from the explanation tool, an explanation comprising at least an identification of at least one of the authentication request features that contributed most to the detecting the authentication request as anomalous.

2. The method of claim 1, wherein the explanation tool is integrated gradients (IG).

3. The method of claim 1, wherein the encoder-decoder model is a variational autoencoder (VAE).

4. The method of claim 1, wherein each authentication request feature in the explanation is paired with a score and the score reflects a degree of contribution to the detecting by the encoder-decoder model.

5. The method of claim 4, wherein a magnitude of the score reflects the degree of contribution.

6. A non-transitory computer readable storage medium impressed with computer program instructions to explain an anomaly detected in an authentication request by a classifier, the instructions, when executed on a processor, implement a method comprising:

obtaining an unsupervised encoder-decoder model, the encoder-decoder model having been trained to detect anomalous authentication requests;

obtaining a multi-layer perceptron (MLP) model trained to provide MLP results similar to encoder-decoder results when the same features are provided to both the unsupervised encoder-decoder model and the MLP model, wherein the encoder-decoder results served as ground truth during the MLP model training, the MLP model is trained by providing, as input, the input to the encoder-decoder model, and targeting, as output, a reconstruction loss error of the encoder-decoder model;

embedding authentication request features from an authentication request into an embedding space to generate embedding features;

providing the embedding features to the encoder-decoder model;

detecting, by the encoder-decoder model, that the authentication request is anomalous, the anomaly is reflected by a risk score from the encoder-decoder model, and an explainability condition is satisfied when the risk score exceeds a threshold;

responsive to the detecting the authentication request as anomalous, providing the authentication request features to an explanation tool using the MLP model; and obtaining, from the explanation tool, an explanation comprising at least an identification of at least one of the authentication request features that contributed most to the detecting the authentication request as anomalous.

7. The non-transitory computer readable storage medium of claim 6, wherein the explanation tool is integrated gradients (IG).

8. The non-transitory computer readable storage medium of claim 6, wherein the encoder-decoder model is a variational autoencoder (VAE).

9. The non-transitory computer readable storage medium of claim 6, wherein each authentication request feature in the explanation is paired with a score and the score reflects a degree of contribution to the detecting by the encoder-decoder model.

10. The non-transitory computer readable storage medium of claim 9, wherein a magnitude of the score reflects the degree of contribution.

11. A system including one or more processors coupled to memory, the memory loaded with computer instructions to explain an anomaly detected in an authentication request by a classifier, the instructions, when executed on the one or more processors, implement actions comprising:

obtaining an unsupervised encoder-decoder model, the encoder-decoder model having been trained to detect anomalous authentication requests;

obtaining a multi-layer perceptron (MLP) model trained to provide MLP results similar to encoder-decoder results when the same features are provided to both the unsupervised encoder-decoder model and the MLP model, wherein the encoder-decoder results served as ground truth during the MLP model training, the MLP model is trained by providing, as input, the input to the encoder-decoder model, and targeting, as output, a reconstruction loss error of the encoder-decoder model;

embedding authentication request features from an authentication request into an embedding space to generate embedding features;

providing the embedding features to the encoder-decoder model;

detecting, by the encoder-decoder model, that the authentication request is anomalous, the anomaly is reflected by a risk score from the encoder-decoder model, and an explainability condition is satisfied when the risk score exceeds a threshold;

responsive to the detecting the authentication request as anomalous, providing the authentication request features to an explanation tool using the MLP model; and obtaining, from the explanation tool, an explanation comprising at least an identification of at least one of the authentication request features that contributed most to the detecting the authentication request as anomalous.

12. The system of claim 11, wherein the explanation tool is integrated gradients (IG).

13. The system of claim 11, wherein the encoder-decoder model is a variational autoencoder (VAE).

14. The system of claim 11, wherein each authentication request feature in the explanation is paired with a score and the score reflects a degree of contribution to the detecting by the encoder-decoder model.

* * * * *